US005404577A

United States Patent [19]

Zuckerman et al.

[11] Patent Number: 5,404,577

[45] Date of Patent: Apr. 4, 1995

[54] COMBINATION HEAD-PROTECTIVE HELMET & COMMUNICATIONS SYSTEM

[75] Inventors: Lawrence H. Zuckerman, Easton; Kurt P. Schuler, Allentown; Robert E. Gray, Glen Mills, all of Pa.; Robert J. Richter, Cranbury, N.J.; Jeffrey N. Olsen, Newark, Del.; Robert M. Armstrong, Clifton Heights, Pa.

[73] Assignee: Cairns & Brother Inc., Clifton, N.J.

[21] Appl. No.: 716,707

[22] Filed: Jun. 18, 1991

Related U.S. Application Data

[63] Continuation-in-part of Ser. No. 553,438, Jul. 13, 1990, abandoned.

[51] Int. Cl.[6] .............................................. H04B 1/38

[52] U.S. Cl. ........................................ 455/66; 455/89; 455/90; 455/351

[58] Field of Search .................... 455/89, 90, 344, 347, 455/348-351, 66; 381/7, 0.51, 0.83; 379/430; 2/5, 7; 343/905

[56] References Cited

U.S. PATENT DOCUMENTS

| | | | |
|---|---|---|---|
| 2,942,072 | 6/1960 | Cunningham | 379/430 X |
| 3,586,977 | 6/1971 | Lustig | 455/89 X |
| 4,025,734 | 5/1977 | Aloupis | 381/74 X |
| 4,116,237 | 9/1978 | Birch | 2/5 X |
| 4,367,378 | 1/1983 | Jordan | 379/430 |
| 4,833,726 | 5/1989 | Shinoda et al. | 455/89 |
| 5,090,054 | 2/1992 | Grilliot et al. | 2/5 |
| 5,142,700 | 8/1992 | Reed | 455/344 |

*Primary Examiner*—Edward F. Urban
*Attorney, Agent, or Firm*—R. Gale Rhodes, Jr.

[57] ABSTRACT

A generally hands-free, voice communication system in combination with a head-protective helmet. The helmet protects the wearer's head and the communications system permits voice communications between journeyman personnel, e.g. firefighters, police, military, industrial, hazardous material handling personnel, in relatively close proximity with each other and between journeymen and a group leader; and the group leader's communication system to also permit relatively long-range communication between the group leader and a relatively distant communications center such as a fire engine or distant fire company, base station or repeater.

13 Claims, 14 Drawing Sheets

FIG. 3
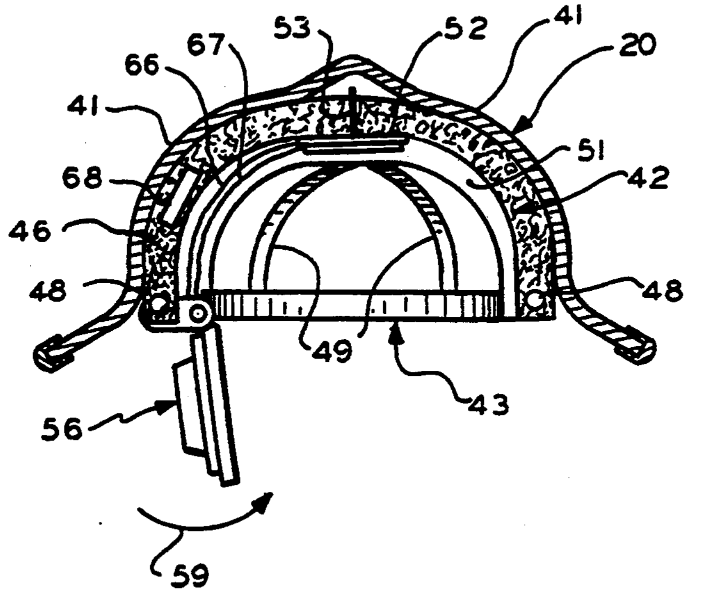
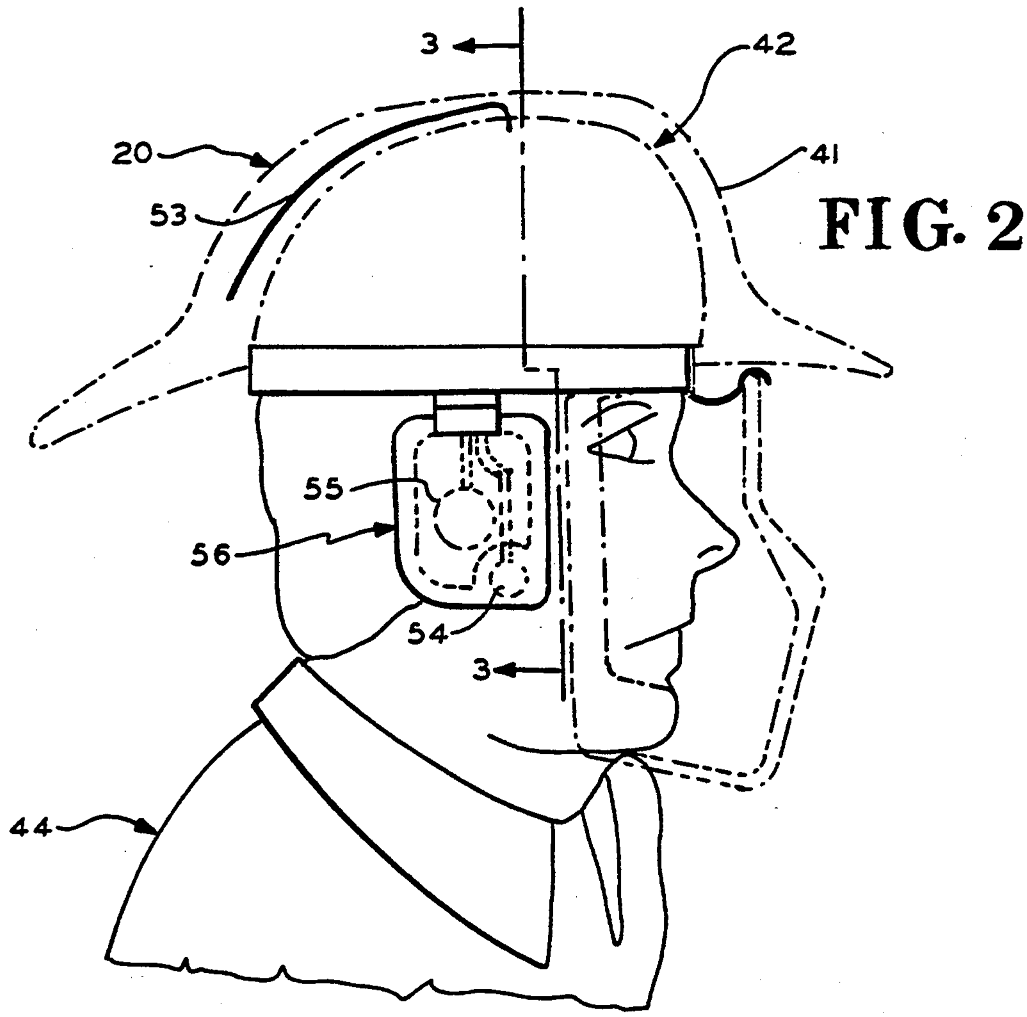
FIG. 2

FIG. 4
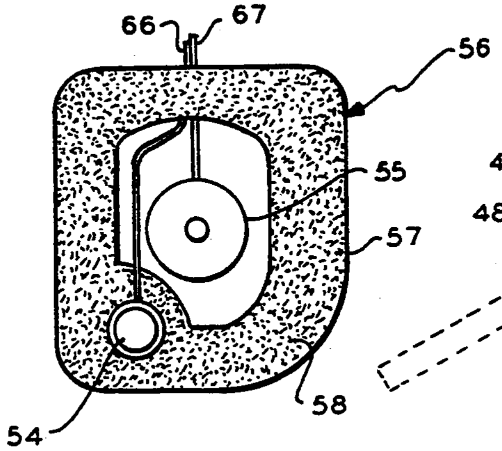
FIG. 5
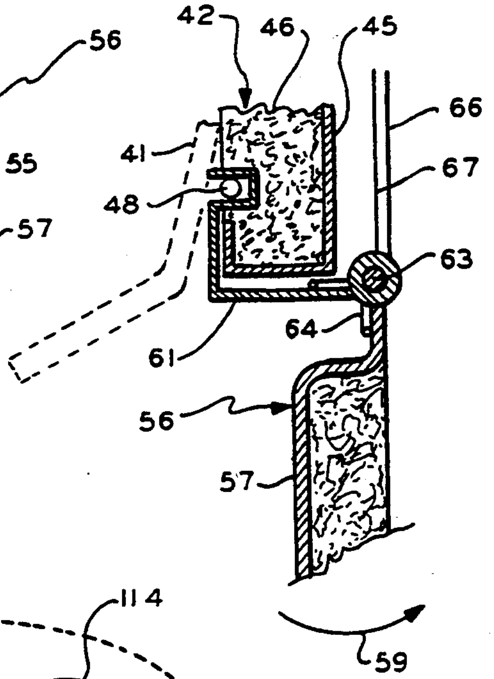
FIG. 9
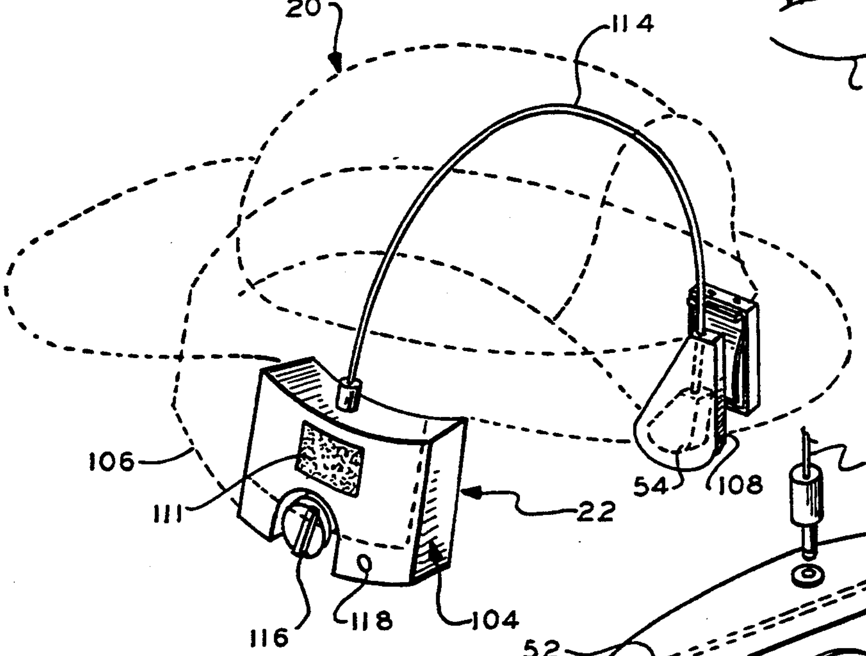
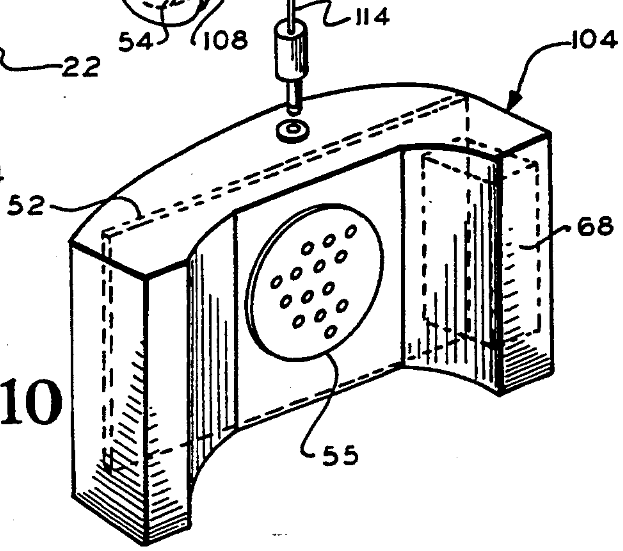
FIG. 10

FIG. 14A
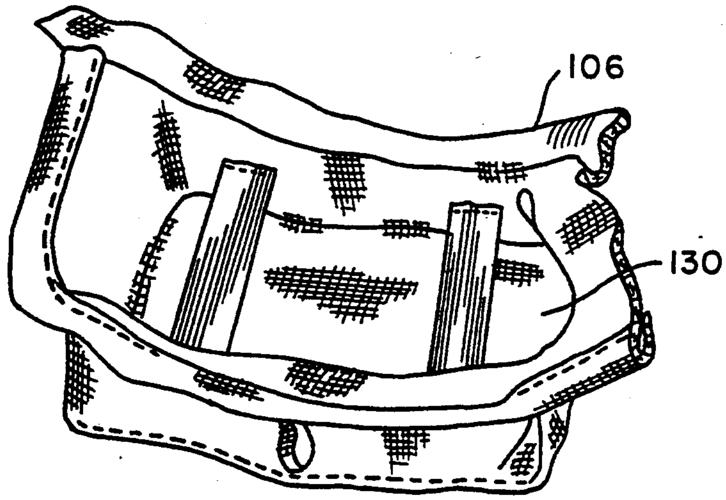
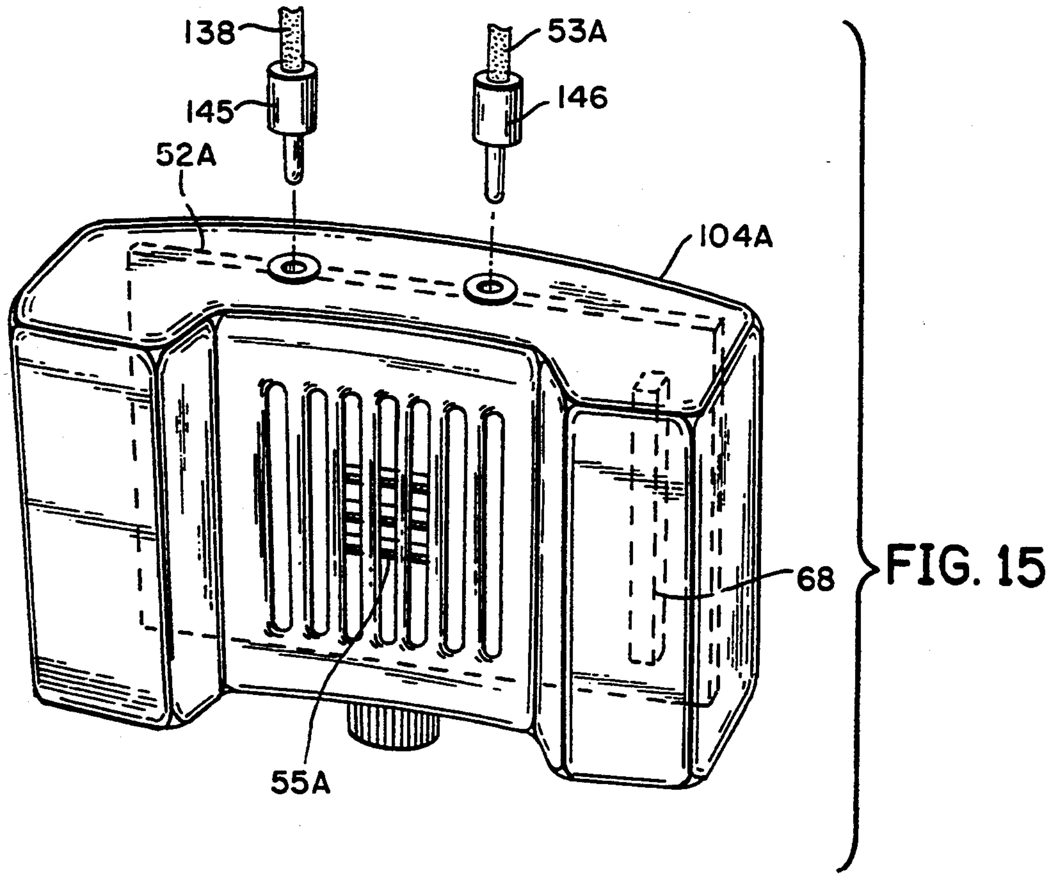
FIG. 15

COMBINATION HEAD-PROTECTIVE HELMET & COMMUNICATIONS SYSTEM

CROSS-REFERENCE TO RELATED APPLICATION

This application is a continuation-in-part application of U.S. patent application Ser. No. 07/553,438, entitled COMBINATION HEAD-PROTECTIVE HELMET & COMMUNICATIONS SYSTEM, filed on Jul. 13, 1990, in the names of Lawrence H. Zuckerman, Kurt P. Schuler, Robert E. Gray and Robert J. Richter and assigned to the same assignee as this application, now abandoned.

FIELD OF THE INVENTION

This invention relates generally to the combination of a head-protective helmet and a relatively short range voice communications system mounted thereon for generally hands-free use by personnel in the fields, for example, of firefighting, police, military, industrial and hazardous material handling, wherein the environment or type of work requires enhanced voice communications between such personnel in the immediate area, and preferably wireless hands-free voice communications. This invention also relates to enhanced hands-free relatively long-range voice communications between, for example, a group leader of such personnel and a distant communications center such as, for example, a relatively distant fire engine or distant fire company base station or repeater.

DESCRIPTION OF THE PRIOR ART

Short-range communications in the areas noted above are normally performed without any augmentation; however, if a facepiece or mask is required for respiratory protection voice communication is severely hindered by the mask. Most manufacturers of self-contained breathing apparatus (SCBA's) provide a speech diaphragm in the facepiece, which typically is a thin metal foil or plastic film which mechanically oscillates when acted upon by the sound waves inside the mask. The effectiveness of such a speech diaphragm in providing intelligible voice communication is generally poor.

Some manufacturers of SCBA's supply a voice amplifier which consists of a microphone inside the facepiece or mask and an amplifier and speaker normally worn on the front of the wearer's clothing because their size and weight hinder mounting on the mask; the amplifier and speaker are usually connected to the facepiece by wires. Although these improve voice communication, they have not been popular due, apparently, to complexity of use and cost, and because their effectiveness is reduced in noise environments such as for example the noise environment present at a fire.

A two-way portable radio can provide long-range communication in the described field of use. Drawbacks of the portable radio for use by all individuals are its cost and the fact that it requires a free hand for operation. Additionally, if relatively long-range systems were used for conversations among many individuals, for example at the scene of a fire, the air waves would be filled with conflicting conversations. The two-way portable radio is practical when used by only one member of a group, typically the group leader, in a situation where many individuals are involved.

Hands-free operation of a two-way portable radio is made possible by use of a voice-operated transmitter (VOX), coupled to a speaker and microphone worn on the head, and an adapter which connects to the input and output plugs of the radio. Systems of this type are made by the David Clark Company, of 360 Franklin Street, Box 15054, Worcester, Mass. 01615-0054 (a headset and microphone work under the helmet, not for use with breathing apparatus) and Interspiro of 11 Business Park Drive, Branford, Conn. 06405 (a radio interface for use with a breathing apparatus, but not without it). All known existing systems of this type are bulky, expensive, complex and awkward to use because of the wires which connect the head gear to the belt-mounted or clothing-mounted radio.

OBJECTS AND SUMMARY OF TEE INVENTION

There are eight general objects of the present invention; these are:

(a) to provide a protective-helmet mounted relatively short-range, multi-user voice communications network for all individuals involved in hazardous operations such as firefighting;

(b) to mount the relatively short-range voice communications system completely on the user's helmet where it is always available since head protection is virtually always worn by personnel in such hazardous operations;

(c) to provide a short-range voice communications system which does not cause short-range individual, tactical conversations to interfere with strategic, long-range communications;

(d) to produce a short-range voice communications system which is completely wireless, having no connections between the helmet and any other part of the wearer's equipment;

(e) to provide a voice communications system which is completely hands-free allowing complete freedom of the hands for work without hindrance;

(f) to provide a voice communications system which is not hindered by noise in the surrounding environment as is a problem with the above-noted voice amplifier;

(g) to provide a relatively short-range voice communications system which can be connected to a relatively long-range voice communications system in a wireless manner;

(h) to provide wireless voice communication between the group leader and his relatively long-range portable two-way radio on a first frequency, and in addition to provide wireless voice communication between the group leader and other members of the group on a different radio frequency.

Apparatus satisfying these objects and embodying the present invention may include, in combination, a head-protective helmet and a relatively short-range communications system mounted thereon including a transceiver mounted on the helmet for transmitting and receiving voice communications, an antenna connected to the transceiver and residing within the helmet, a microphone mounted on the helmet in a position for receiving voice communication from the wearer of the helmet, and a speaker mounted on the helmet in a position to transmit voice commmunication to the wearer of the helmet; such combination providing generally hands-free voice communication between members of a group wearing such combination as well as head protection to each group member. In a further embodiment of the invention generally hands-free voice communications are provided between the group leader of the members to and through a relatively long-range portable two-way radio, e.g. the "walkie-talkie," to a relatively distant communications center such as a fire engine or distant fire company base station or repeater.

BRIEF DESCRIPTION OF THE DRAWINGS

FIG. 2 is a side view of a first embodiment of the combination protective helmet and communication system mounted thereon of the present invention shown worn by a firefighter;

FIG. 3 is a cross-sectional view taken generally along the line 3—3 in FIG. 2 in the direction of the arrows;

FIG. 4 is a side view of an ear cup showing the mounting of a speaker and microphone included in the communication system of the present invention;

FIG. 5 is a partial view illustrating the mounting of the ear cup shown in FIGS. 2 and 4 and the manner of spring biasing the ear cup toward a head bone, e.g. jawbone, of the wearer of the head-protective helmet to place the microphone into communication with such head bone;

FIGS. 9, 10 and 11 illustrate an alternate embodiment of the combination protective helmet and communications system mounted thereon of the present invention;

FIG. 14A is a partial view taken generally from FIG. 14 showing a portion of the earflap provided with a pocket for receiving a housing in which is mounted transceiver circuitry, a speaker, and a battery;

FIG. 15 is a view in perspective of a housing in which is mounted transceiver circuitry, a speaker, and a battery and which housing resides in the pocket shown in FIG. 14A;

FIG. 22 is a partial view of the interior of the shroud shown in FIG. 21, taken generally along the line B—B in FIG. 23, and showing the mounting of the speaker; FIG. 23 is a partial vertical cross-sectional view taken generally along the line A—A in FIG. 20; and FIG. 25 is a view in perspective showing a cradle of straps whose lower ends are wrapped around and connected to a generally circular resilient mounting member, and chin straps.

DETAILED DESCRIPTION OF THE PREFERRED EMBODIMENT

Figure 1:
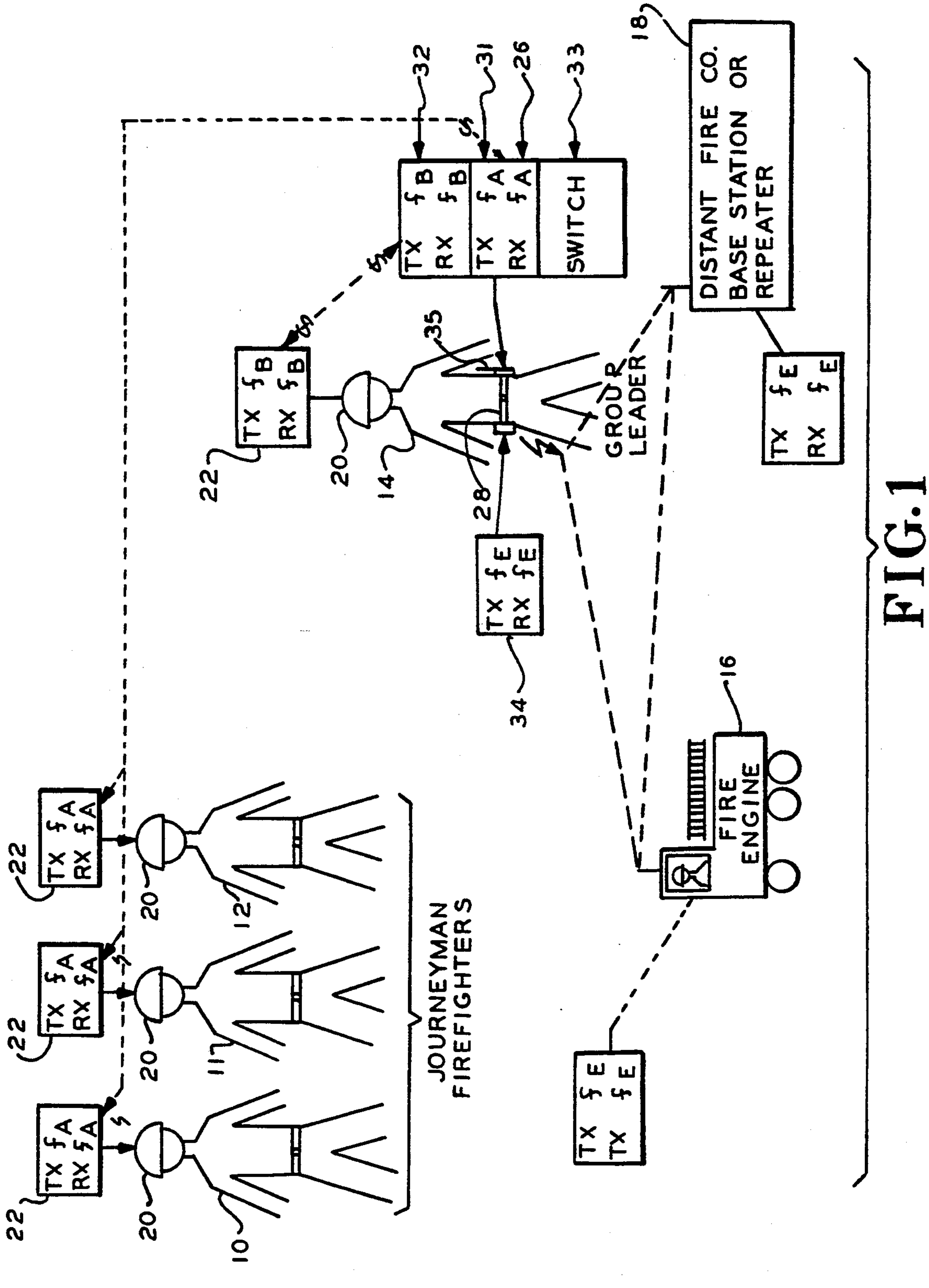
FIG. 1 is a diagrammatical illustration of the combination protective helmet and communication system of the present invention and the function thereof.

Referring to FIG. 1, there is illustrated diagrammatically a combination head-protective helmet 20 and voice communications system 22 mounted on the helmet which combination is the first embodiment of the present invention and which combination is for providing hands-free relatively short-range communications (e.g. reliable range of about fifty feet), between a plurality of journeymen 10, 11 and 12 and a group leader 14; the journeymen and group leader may be, for example, fighting a fire inside a building. In general it will be understood that each journeyman 10, 11 and 12 and group leader 14 is illustrated diagrammatically wearing the combination head-protective helmet 20 and voice communications system 22 mounted thereon of the present invention. It will be further understood that each voice communications system 22 includes, inter alia, a transceiver (not shown), and that the transceivers mounted on the helmets worn by the journeymen 10, 11 and 12 receive and transmit voice communications on a first frequency $f_A$ and that the transceiver (not shown) mounted on the helmet worn by the group leader 14 transmits and receives voice communications on a second frequency $f_B$ for reasons set forth below with regard to further embodiments of combinations of the present invention.

Referring still to FIG. 1, and to a further embodiment of the present invention illustrated diagrammatically therein, the further embodiment may include the combination head-protective helmet 20 and communications system 22 mounted thereon described generally above and, in further combination, a module indicated by general numerical designation 26 which module may be worn by the group leader 14 by being mounted, for example, on a belt 28 worn by the group leader; the group leader 14 is also provided with a belt antenna 35 which may be mounted on the module 26 and connected thereto. Generally it will be understood that the module 26 includes a first module transceiver 31 for receiving and transmitting voice communications on the first frequency $f_A$, a second module transceiver 32 for receiving and transmitting voice communications on the second frequency $f_B$, and switch 33 for automatically transferring voice communications from one of of the journeyman 10, 11, 12 received on the first module transceiver 31 at the first frequency $f_A$ to the second module transceiver 32 for retransmission to the group leader 14 at the second frequency $f_B$, and the switch 33 is also for transferring voice communications from the group leader 14 received by the second module transceiver 32 at the second frequency $f_B$ to the first module transceiver 31 for retransmission simultaneously to all of the journeymen 10, 11 and 12 at the first frequency $f_A$ to provide or enable relatively short-range, hands-free wireless voice communications between the journeymen 10, 11 and 12 and the group leader 14 thereby facilitating their work activities, such as firefighting, in a wireless hands-free manner. Relatively short range voice communications are provided at all times between the journeymen 10, 11 and 12 by the voice communications systems 22 mounted on their helmets 20 since the transceivers thereof all transmit and receive on the first frequency $f_A$.

A still further embodiment of the present invention is illustrated diagramatically in FIG. 1, and which further embodiment includes the above-noted first and second embodiments, and further includes a relatively long-range transceiver 34 which may be worn by the group leader 14 by being mounted on his belt 28. It will be understood that the long range transceiver 34 is for receiving and transmitting relatively long-range communications at a third frequency $f_E$ to provide relatively long-range communications between the group leader 14 and one or more distant communications centers such as, for example, fire engine 16 and/or a distant fire company base station or repeater 18. It will be generally understood that the long range transceiver 34 is connected to the module means 26 to permit, once enabled as taught below, wireless, hands-free relatively long range communications between the group leader 14 and the distant communications center. Further generally, it will be understood that the switch 33 is for automatically transferring voice communications from the group leader 14 received by the second module transceiver 32 at the second frequency $f_B$ to the long-range transceiver 34 for retransmission to the distant communications center at the third frequency $f_E$ and for automatically transferring voice communications from the distant communications center received by the long range transceiver 34 at the third frequency $f_E$ to the second module transceiver 32 for retransmission to the group leader at the second frequency $f_B$ to enable wireless hands-free relatively long-range communications between the group leader 14 and the distant communications center.

Referring now to FIGS. 2–5, and particularly to FIGS. 2 and 3, an embodiment of the combination head-protective helmet 20 and communications system 22 referred to above and shown diagrammatically in FIG. 1, is shown in greater detail with the protective helmet 20 being indicated in FIGS. 2 and 3 by general numerical designation 20. The head-protective helmet 20 may be of the type known to the art and may include a suitable external shell 41 of the type known to the art, an internal impact cap 42 and a suspension system indicated by general numerical designation 43 in FIG. 3 and which suspension system 43 is for being engaged by the head of a wearer, such as for example the firefighter indicated by general numerical designation 44 in FIG. 2, for suspending or supporting the helmet 20 on the head of the firefighter 44. The internal impact cap 42, as may be better understood from FIG. 5, may include rigid plastic shell 45 filled with a suitable impact absorbing plastic foam 46. The suspension system 43, FIGS. 3 and 5, may include a generally circular mounting member 48 residing in a generally circular groove (not shown) provided in the outer lower portion of the internal impact cap 42 and a plurality of straps, straps 49 shown in FIG. 3, whose lower strap ends are wrapped around and suitably connected to the generally circular mounting member 48 to connect the straps 49 to the generally circular mounting member and thereby to the internal impact cap 42. It will be noted from FIG. 3 that a space 51 is provided between the inner surface of the internal impact cap 42 and the straps 49.

It will be understood, generally, that the communications system 22 referred to above and illustrated diagrammatically in FIG. 1 may include a transceiver 52, transceiver circuitry, shown in FIG. 3 residing in the space 51 and suitably fastened to the inner surface of the internal impact cap 42, a bone conduction microphone 54 and speaker 55 shown in FIGS. 2 and 4 as being mounted on an ear cup indicated by general numerical designation 56 and a suitable antenna 53 residing internally of the helmet 20 between the external shell 41 and the internal impact cap 42 as may be best understood by referring to FIG. 2.

The ear cup 56, FIGS. 4 and 5, may include a suitable rigid outer shell 57 and a suitable plastic foam ring 58 residing interiorly of and suitably secured to the inner surface of the outer shell 57. It will be understood generally from FIG. 3 that the ear cup 56, and thereby the microphone 54 and speaker 55, are mounted to the helmet 20, particularly the internal impact cap 42, and spring biased, as indicated by the arrow 59 in FIG. 3, towards the side of the face of the firefighter 44 (FIG. 2) to place the bone conduction microphone 54 in conduction or communication with the jaw bone of the firefighter and the speaker 55 in voice communication with the ear of the firefighter. Such mounting and spring biasing of the ear cup 56 may be provided, as shown in FIG. 5, by the bracket 61, hinge pin 63, and torsion spring 64. As may be noted from FIG. 5, the upper portion of the bracket 61 is mounted to the internal impact cap 42 by having its upper portion partially encircle the generally circular mounting member 48. The hinge pin 63, in the manner known to the art, is encircled by the lower portion of the bracket 61 and the upper portion of the outer shell 57 of the ear cup 56 encircles the hinge pin 63. The torsion spring 64 also encircles the hinge pin and engages both the bracket 61 and outer shell 57 of the ear cup 56 to bias the ear cup toward the side of the face of the firefighter as described above and indicated by the arrow 59 in FIG. 5. The plastic foam ring 58, FIG. 4, provides insulation and impact absorbing mounting for the bone conduction microphone 54 and speaker 55. The bone conduction microphone 54 and speaker 55, FIGS. 3 and 4, are suitably connected to the transceiver 52, transceiver circuitry, (FIG. 3) by suitable leads 66 and 67. As may be understood from FIG. 3, the communications system 22 may further include a suitable battery 68 residing in a recess formed in the outer portion of the impact absorbing plastic foam 46 of the internal impact cap 42; battery 68 may be suitably connected to the transceiver 52 by leads, not shown, to provide energy to the transceiver 52, bone conduction microphone 54 and speaker 55.

Figure 6:
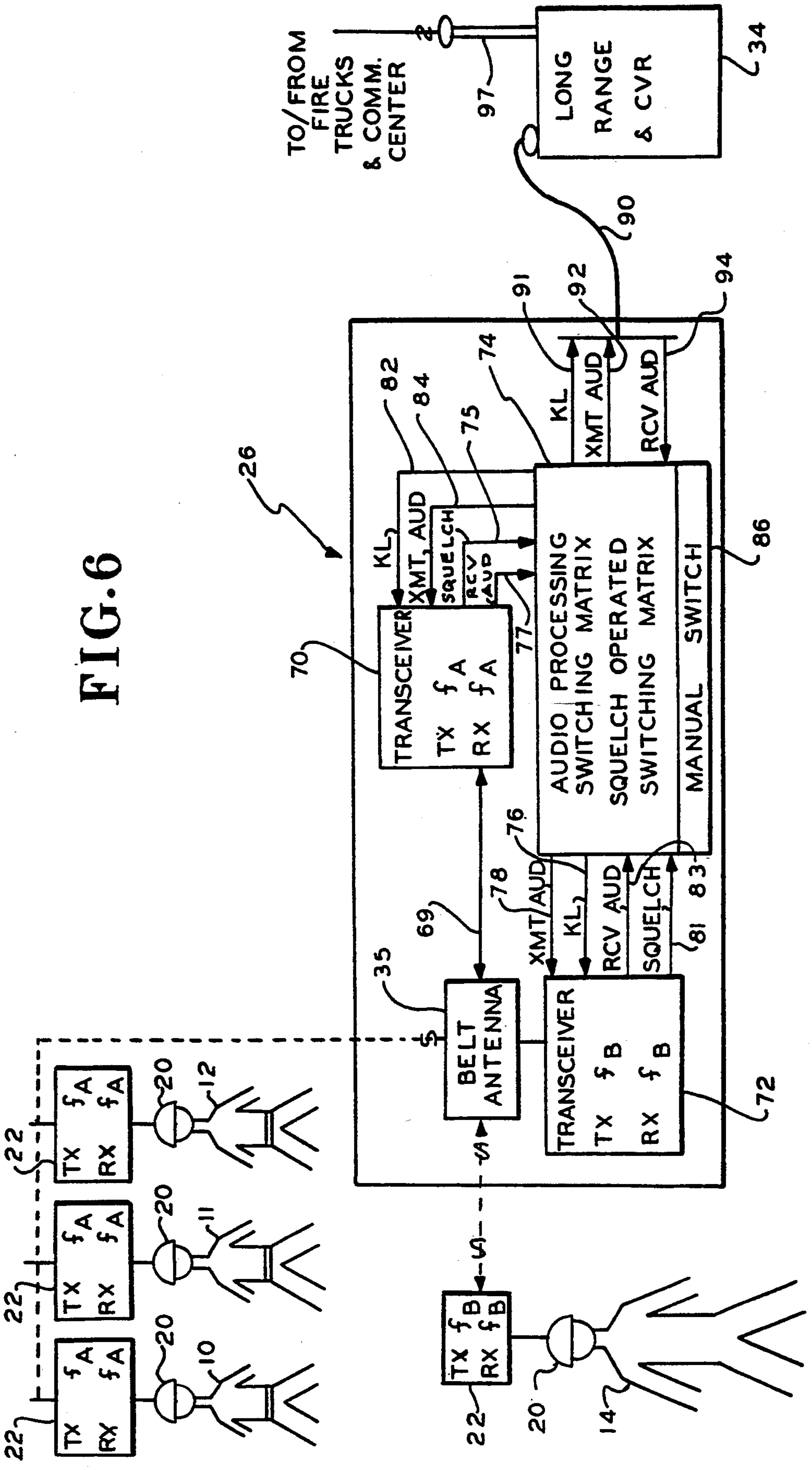
FIG. 6 is a block diagram primarily of a group leader's module of the hands-free, or wireless, communications system of the present invention.

Referring now to FIG. 6, in addition to the journeymen 10, 11 and 12 and group leader 14, and their respective combination head-protective helmets 20 and voice communications systems 22, there is illustrated diagramatically and shown in block diagram the module 26 (shown in FIG. 1 as being mounted on the group leader's belt) and the long range transceiver 34 and the group leader's belt antenna 35 (both shown in FIG. 1 as being mounted on the group leader's belt 18). It will be generally understood that the module 26 includes a first module transceiver 70 for receiving and transmitting voice communications on the first frequency $f_A$, a second module transceiver 72 for receiving and transmitting voice communications on the second frequency $f_B$ and an audio processing switching matrix squelch operated switching matrix 74. Generally it will be understood that the audio processing switching matrix squelch operated switching matrix 74 is for receiving voice communications at the first frequency $f_A$ from the journeymen 10, 11 and 12 and transferring such voice communication to the group leader at the second frequency $f_B$ and for receiving voice communications from the group leader at the second frequency $f_B$ and transferring the same to the journeymen, all simultaneously, at the second frequency $f_B$.

In operation, FIG. 6, upon a journeyman 10, 11 or 12 speaking into his bone conduction microphone (e.g. microphone 54, FIGS. 2 and 4), his voice communication will be transmitted by his transceiver 52 and over his antenna (e.g. antenna 53, FIG. 2) at the first frequency $f_A$ and such voice communication will be received by the group leaders belt antenna 35 and transmitted over line 69 to the first module transceiver 70 which will receive such voice communication at the first frequency $f_A$ and produce a squelch signal (squelch) and transmit the squelch signal over the line 75 to the audio processing switching matrix squelch operated switching matrix 74 which will produce a transmit key line signal (KL) which is transmitted over the line 76 to turn on the second module transceiver 72. In addition, the first module transceiver 70 will receive the voice communication from the journeyman at the first frequency $f_A$ and produce a received audio signal (RCV AUD) and transmit such signal over line 77 to the audio processing switching matrix squelch operated switching matrix 74 which will transfer such received audio signal as the transmit audio signal (XMT AUD) which transmit audio signal is transmitted over line 78 to the second module transceiver 72 where it is retransmitted at the second frequency $f_B$ over the group leader's belt antenna 35 to his helmet antenna (e.g. antenna 53, FIG. 2) and received by his transceiver 22 at the second frequency $f_B$ which transceiver 22 produces voice communication (i.e. voice communication from the journeyman) heard by the group leader over his speaker (e.g. speaker 55, FIGS. 2 and 4).

Upon the group leader 14 speaking into his helmet bone conduction microphone (e.g. microphone 54, FIGS. 2 and 4) his voice communication will be received by his transceiver 22 and transmitted over his helmet antenna (e.g. antenna 53, FIG. 2) and transmitted at the second frequency $f_B$ to the group leader's belt antenna 35 where it will be received by the second module transceiver 72 at the second frequency $f_B$ which will produce a squelch signal (squelch) which will be transmitted over line 81 to the audio processing switching matrix squelch operated switching matrix 74 which will produce a transmit key line signal (KL) which is transmitted over line 82 to turn on the first module transceiver 70. In addition, the second module transceiver 72 will transmit the voice communication received from the group leader 14 at second frequency $f_B$ and produce therefrom a receive audio signal (RCV AUD) and transmit the received audio signal over the line 83 to the audio processing switching matrix squelch operated switching matrix 74 which will transfer the same as the transmit audio signal (XMT AUD) over line 84 to the first module transceiver 70 where it is transmitted therefrom at the first frequency $f_A$ over the group leader's belt antenna 35 at the first frequency $f_A$ and received simultaneously by all journeymen 10, 11 and 12 by their respective helmet antennae and transmitted therefrom to their respective transceivers 52 at the first frequency $f_A$ and which transceivers 52 will produce voice communication (i.e. voice communication from the group leader) heard in the speakers 55 (FIGS. 2 and 4) of all of the journeymen.

Referring again to FIG. 6 there is also illustrated diagrammatically a further embodiment of the present invention which includes the above-described combination head-protective helmet and communications system 22 mounted thereon, and the group leader module 26 and belt antenna 35 for hands-free, wireless, voice communication between the journeymen 10, 11 and 12 and the group leader 14 and in addition includes the relatively long-range transceiver 34 which is shown in FIG. 1 as being worn by the group leader 14 by being mounted on his belt 28, and which was described above as being for relatively long-range communications between the group leader 14 and a distant communications center such as for example the fire engine 16 or distant fire company base station or repeater 18 of FIG. 1. It will be understood that in this embodiment the audio processing switching matrix squelch operated switching matrix 44 is provided with a manually operated switch 86 described below and shown in FIG. 8 and which switch 86 permits the group leader 14 to switch from relatively short-range voice communication with the journeymen 10, 11 and 12 of FIG. 1, to relatively long-range voice communication over the transceiver 34 with, for example, the fire engine 16 or distant fire company base station or repeater 18 of FIG. 1.

Upon being manually switched, it will be understood generally from FIG. 6 that the group leader 14 (FIG. 1) voice communicates or transmits over his helmet transceiver 52 at the second frequency $f_B$ and over his helmet antenna (e.g. antenna 53, FIG. 2) to his belt antenna 35 and therefrom to the second module transceiver 72 which receives the voice communication from the group leader 14 at the second frequency $f_B$ and produces therefrom a squelch signal (squelch) which is transmitted over line 81 to the matrix 74 which matrix 74 produces a transmit key line signal (KL) transmitted over the line 91 and therefrom over belt cable 90 (which cable connects the relatively long-range transceiver 34 to the module 26) to the relatively long-range transceiver 34 to turn on the transceiver 34. In addition, the second module transceiver 42 produces from the voice communication received from the group leader 14 at the second frequency $f_B$ a received audio signal (RCV AVD) and transmits the received audio signal over line 83 to the matrix 74 which transfers such received audio signal (RCV AUD) as the transmit audio signal (XMT AUD) over line 92 and the belt cable 90 to the relatively long-range transceiver 34 and therefrom over the antenna 97 to a distant communications center, for example, fire engine 16 or distant fire company base station or repeater 18 of FIG. 1. For voice communications from, for example, fire engine 16 or distant fire company base station or repeater 18 of FIG. 1 to the group leader 14, FIG. 6, voice communications ale transmitted from the fire engine, or other distant communications center at the third frequency $f_E$ and are received at the third frequency $f_E$ by the relatively long-range transceiver 34 and transmitted therefrom over the belt cable 90 and line 94 to the audio processing switching matrix squelch operated switching matrix 74 which produces a transmit key line signal (KL) transmitted over line 76 to the second module transceiver 72 to turn on the transceiver 72. The voice communications from the distant communications centers at the third frequency $f_E$ are received by the relatively long-range transceiver 34 and transmitted from the transceiver 34 over the belt 90 and line 94 to the matrix 74 as received audio signals (RCV AUD); the matrix 74 transfers such received audio signals to the second module transceiver 72 as transmit audio signals (XMT AUD) over line 78. The second module transceiver 72 transmits such transmit audio signals at the second frequency $f_B$ over the group leader's belt antenna 35 to his helmet antenna (e.g. helmet antenna 53, FIG. 2) to the group leader's transceiver 52 (e.g. transceiver 52, FIG. 3) which receives such transmit signals and produces voice communications (voice communications from the distant communications center) heard by the group leader 14 in his helmet speaker (e.g. helmet speaker 55 of FIGS. 2 and 4).

Figure 7:
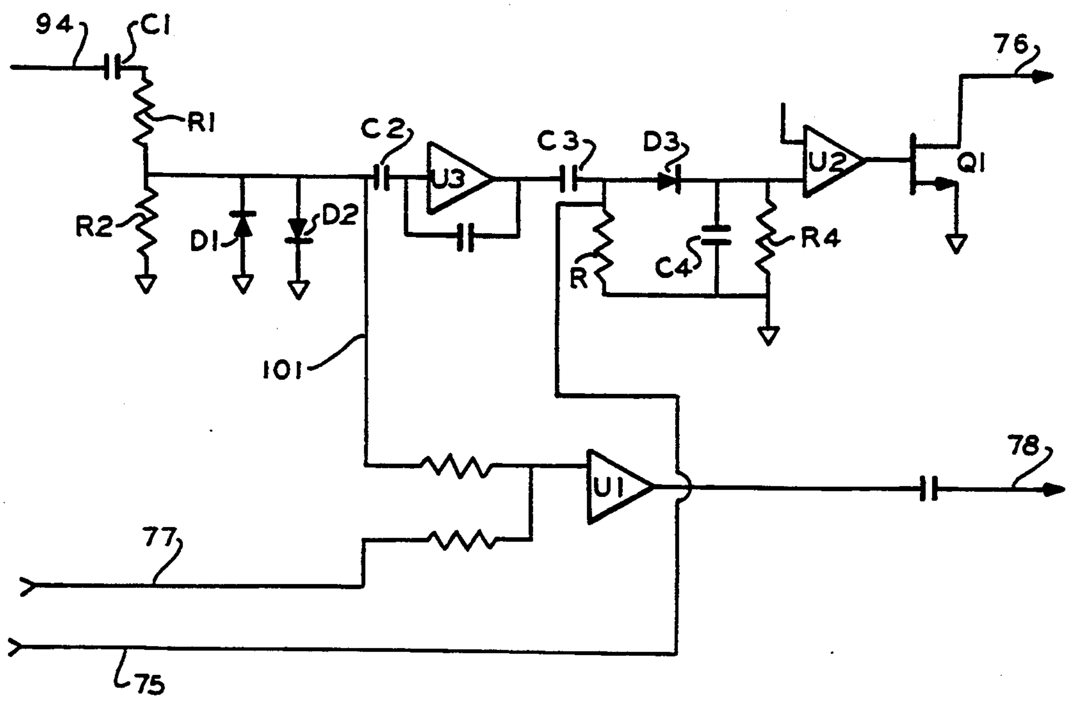
FIGS. 7 and 8 are circuit diagrams of circuitry contained within a portion of the module shown in FIG. 6.
Figure 8:
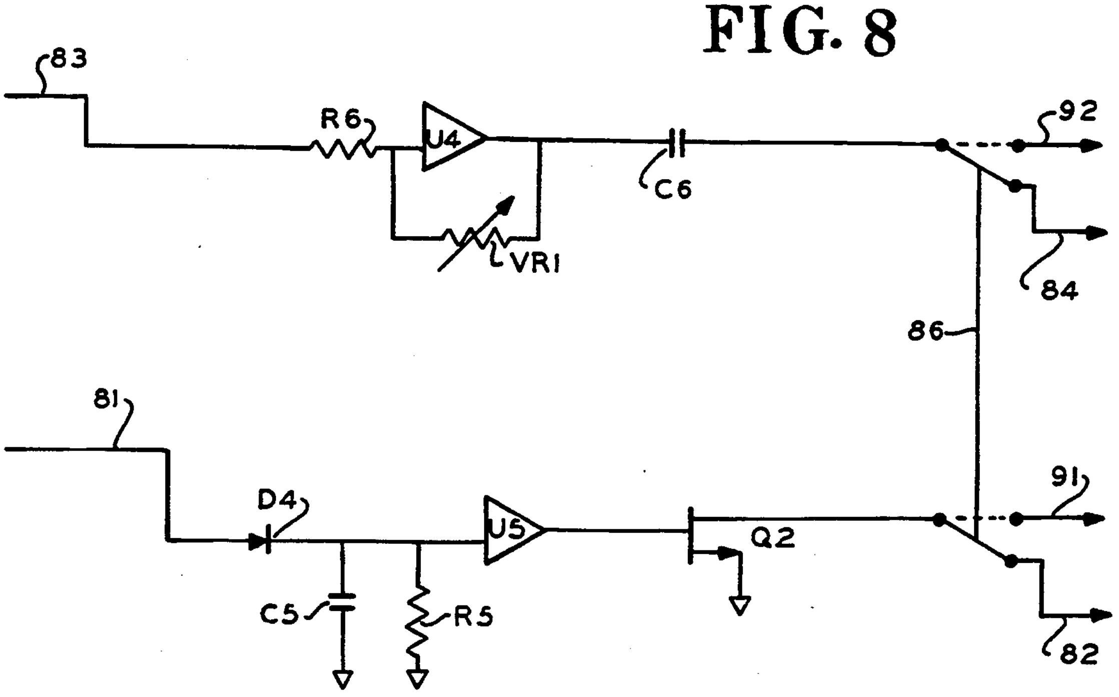

Referring now more specifically to the audio processing switching matrix squelch operated switching matrix 74 of FIG. 6, it will be understood that such matrix 74 may comprise the more detailed circuits shown in FIGS. 7 and 8. It will be generally noted from FIGS. 7 and 8 that the line connections shown in FIG. 6 and described above are given the same numerical designations in FIGS. 7 and 8 for convenience of reference and understanding. It will be presumed that a journeyman 10, 11 or 12 (FIGS. 1 or 6) is communicating with the group leader 14 (FIGS. 1 or 6) and such journeyman is transmitting at the first frequency $f_A$ over his voice communications system 22 mounted on his helmet 20 whereupon such voice communications or audio signals from the journeyman's communications system 22 will be transmitted at the first frequency $f_A$ and to the first module transceiver 70 (FIG. 6) as described above whereupon, as also described above, the second module transceiver 70 will transmit a squelch signal (squelch) over the line 75 as shown in FIG. 6 and also as shown in FIG. 7, and referring now to FIG. 7, which squelch signal is transmitted over the line 75 to the comparator U2 and therefrom to the field effect transistor Q1 which produces the transmit key line signal (KL) transmitted over line 76 to the second module transceiver 72 (FIG. 6) to turn on the second module transceiver 72; parallel connected capacitor C4 and resistor R4 of FIG. 7 provide a time delayed network which allows the second module transceiver 72 (FIG. 6) to remain on for approximately 200 milliseconds to prevent the unwanted transmission of noise during a pause between, for example, syllables of the communication being transmitted, and the diode D3 is used as a unidirectional device to allow fast turn on of the comparator U2 without affecting the time constant of capacitor C4 and resistor R4. As further taught above with regard to the description of FIG. 6, the first module transceiver 40 will transmit received audio signals (RCV AUD) over line 77, and referring now to line 77 in FIG. 7, such received audio signals will be transmitted through the operational amplifier U1 over the line 78 as transmitt audio signals (XMT AUD) to the second module transceiver 42 (FIG. 2) and transmitted therefrom at the second frequency $f_B$, as also described above, to the group leader 14.

It will now be presumed that the group leader 14 (FIGS. 1 or 6) is communicating with a journeyman 10, 11 or 12 (FIGS. 1 or 6) and is transmitting over his communications system 22 (FIGS. 1 or 6) at the second frequency $f_B$, and as described above, the second module transceiver 72 (FIG. 6) will produce the squelch signal (squelch) transmitted over the line 81 as described above with regard to FIG. 6 and which line 81 is now referred to and shown in FIG. 8. The squelch signal is transmitted over line 81, FIG. 8, through diode D4, charging capacitor C5 and turning operational amplifier U2 on whereupon the output of the operational amplifier U2 will turn on the field effect transistor Q2 which produces the transmit key line signal (KL) which is transmitted over line 82, also line 82 of FIG. 6, turning on the first module transceiver 70 of FIG. 6. The second module transceiver 72 (FIG. 6) will also produce the received audio signals (RCV AUD) as described above and transmit such received audio signals over line 83 as shown in FIG. 6, and referring now to FIG. 8, over line 83 through operational amplifier U4 and capacitor C6 and out over line 84 as transmit audio signals (XMT AUD) to the first module transceiver 70 of FIG. 6, and as also described above, thereafter, the first module transceiver 70 will transmit such signals at the first frequency $f_A$ to the communications systems 22 of all the journeymen 10, 11 and 12, FIGS. 1 and 6 whereupon the respective helmet transceivers 52 will produce voice communications heard by all journeymen in their respective helmet speakers 55 as voice communication from the group leader.

It will now be presumed that the group leader 14 (FIG. 1) desires to communicate with, for example, a distant communications center such as fire engine 16 or distant fire company base station or repeater 18 of FIG. 1 whereupon the group leader will operate the manual mode switch 86, FIGS. 6 and 8, to move the manual mode switch from the position shown in solid line in FIG. 8, its normal position for enabling voice communications between the journeymen and group leader, to the position shown in dashed outline in FIG. 8 whereupon the manual mode switch 86 connects to lines 91 and 92 in FIG. 8. Thereafter, the group leader 14 (FIGS. 1 or 6) will transmit over communications system 22 at the second frequency $f_B$ as described above in connection with FIG. 6 to the second module transceiver 72 whereupon transceiver 72 will produce the squelch signal (squelch) which is transmitted over line 81, and referring now to FIG. 8, over line 81 shown in FIG. 8. The squelch signal, FIG. 8, will be transmitted through diode D4, through operational amplifier U5 turning on field effect transistor Q2 which will produce the transmit key line signal (KL) which is transmitted over line 91 to turn on the long-range transceiver 34 of FIGS. 1 and 6. The receive audio signal (RCV AUD) from the second module transceiver 72, as described above in connection with FIG. 6, will be transmitted over line 83 as shown in FIG. 6, and referring now to FIG. 8 over the line 83 shown in FIG. 8. Referring to FIG. 8, the received audio signal will be transmitted over line 83 through operational amplifier U4, capacitor C6, and over line 92, and referring now to FIG. 6, will be transmitted to the long-range transceiver 34 over line 91 as the transmit audio signal (XMT AUD) and therefrom at the third frequency $f_E$ to a distant communications center, for example, the fire engine 16 or distant fire company base station or repeater 18 of FIG. 1.

Long-range voice communications transmitted at the third frequency $f_E$ from a distant communications center, for example, either the fire engine 16 or distant fire company base station or repeater 18 of FIG. 1 are transmitted to the group leader 14, FIGS. 1 or 6, by long-range transceiver 34 first converting such voice communications, or audio signals, to the received audio signals (RCV AUD) transmitted to the matrix 74 over line 94 in FIG. 6 as described above. Referring now to FIG. 7, and to line 94 shown therein, such received audio signals will be transmitted over line 94 through capacitor C1, split between resistors R1 and R2 and diodes D1 and D2, which diodes are used to limit the audio level, and through operational amplifier U3, capacitor C3, diode D3 through operational amplifier U2 turning on field effect transistor Q1 which produces the transmit key line signal (KL) transmitted over line 76 (FIG. 6) to turn on the second module transceiver 72 of FIG. 6. Thereafter, the fire engine 16 or other distant fire company base station or repeater 18, FIG. 1, can voice communicate with the group leader 14 (FIGS. 1 or 6), as the received audio signals (RCV AUD) from the long-range transceiver 34 (FIG. 6) which are transmitted over line 94 shown in FIG. 7, through capacitor C1, resistor R1 and over line 101 and through operational amplifier U1 and therefrom over line 78 and, referring again to FIG. 6, over line 78 shown therein as transmitted audio signals (XMT AUD) to the second module transceiver 72 and thereafter transmitted at the second frequency $f_B$ to the group leader 14 as described above in connection with FIG. 6.

Figure 11:
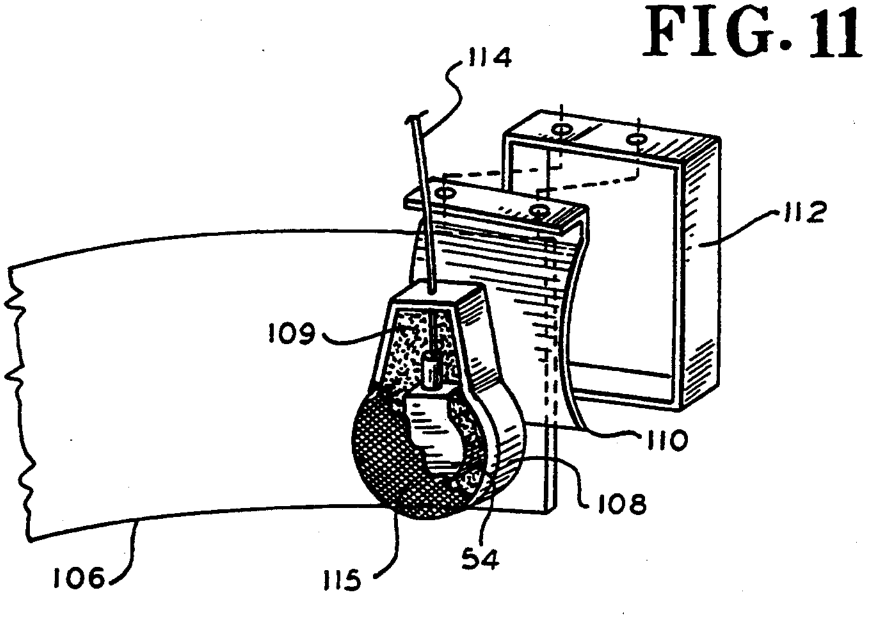

Referring now to FIGS. 9, 10 and 11, there is shown an alternate embodiment of a combination head-protective helmet 20 and communications system 22 mounted thereon of the present invention. For convenience of reference and understanding, the same numerical designations used above for the transceiver, bone conduction microphone, speaker, and battery are used in this embodiment. In this alternate embodiment, it will be understood generally that the transceiver 52, speaker 55, and battery 68 are mounted in a suitable housing identified by general numerical designation 104. It will be understood that the housing 104 may be mounted to the flame retardant ear flap 106 of the helmet 20, FIG. 9, by providing the outer surface of the housing 104 with suitable hook and eye fastener patch 111, sometimes referred to in the art as Velcro ® patch, which attaches or connects to corresponding suitable hook and eye fasteners, or Velcro ®, provided on the inner surface of the ear flap 106; the helmet 20 and flame retardant ear flap 106 may be one of several such combinations known to the art. The bone conduction microphone 54 as shown in FIG. 11 may be suspended in a plastic foam insert 109 located within a suitable plastic housing 108 to isolate the microphone 54 from outside noise and movement of the helmet 20 relative to the wearer's head. A thin rubber cover 115 secures the microphone 54 in the housing 108 while allowing movement of the microphone 54 within the housing 108. The housing 108 and hence microphone 54 are spring biased, by leaf spring 110 (FIG. 11) toward the side of the face of the wearer of the combination helmet 20 and communications system 22. It will be understood that the leaf spring 110 is received within a suitable housing 112, FIG. 11, with the leaf spring 110 and housing 112 being secured to the helmet 20 (FIG. 9) by suitable screws extending through the holes shown in the tops of the leaf spring 110 and housing 112 in FIG. 11 and which screws may be screwed into the internal impact cap 42 (FIG. 3). As may be understood from FIG. 9, the bone conduction microphone 54 is connected to the transceiver 52 (FIG. 10) by the combination cable and internal helmet antenna 114 with the end of the combination cable and antenna 114 opposite the bone conduction microphone 54 connected to the transceiver 52, FIG. 10, by a suitable plug and jack connection as shown.

The alternate embodiment of the combination helmet 20 and communications system 22 mounted thereon of FIGS. 9–11 has several advantages in that the housing 104 is readily removable from the ear flap 106 of the helmet 20 to permit rapid changing of the frequency on which the transceiver 52 receives and transmits, and this readily permits several different teams of firefighters, journeymen and individual group leaders to be in close proximity of each other, such as within a large burning building, without broadcasting on the same frequency. In addition, it permits ready changing of the battery 68 and repair or replacement of the other communications system components. Further, as illustrated in FIG. 9, this embodiment may include an on/off switch for connecting and disconnecting the battery 68, an "on" indicator 118 as shown in FIG. 9, which may be a suitable light emitting diode; such additional components and the manner in which they may be connected to the battery 68 and transceiver 52 are well known to those skilled in the art.

Figure 12:
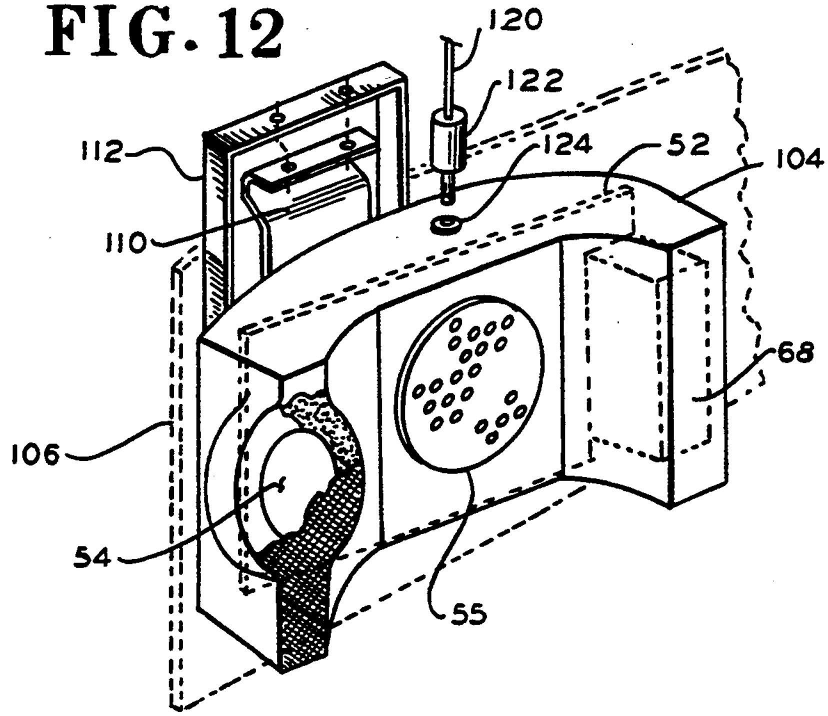
FIG. 12 illustrates a still further alternate embodiment of the combination protective helmet (only the ear flap thereof being shown) and communications system mounted thereon of the present invention.

A third embodiment of the combination head-protective helmet 20 and communications system 22 mounted thereon of the present invention is shown in FIG. 12 wherein the bone conduction microphone 54 is located in the housing 104 in addition to the speaker 55, battery 68 and transceiver 52. In this embodiment the housing 112 and leaf spring 110 may be suitably secured by threads, not shown, extending through the holes shown in the upper portions of the housing 112 and leaf spring 110 to the head-protective helmet 20 by being screwed into engagement with the internal end cap of the cap, such as internal impact cap 42 of FIG. 3. The leaf spring 110 will spring bias the housing 104 and hence the bone conduction microphone 54 into engagement or communication with a bone, such as the jaw bone, of the wearer of the combination helmet and communications system. In this embodiment, the helmet antenna 120 may be suitably connected to the transceiver 52 by the combination plug 122 and jack 124 with the antenna 120 residing internally of the helmet as shown in FIGS. 2 and 3.

It will be understood that the transceiver 52 referred to above and shown in the various drawings may be, for example, the commercially available transceivers of Models Realistic TRC-500 or Realistic TRC-502 available from Radio Shack Corp. The bone conduction microphone 54 referred to above and shown in the various drawings may be, for example, a commercially available microphone such as the Miniature Inertial Transducer/Receiver Model 229X available from Stanton Magnetics, Inc., Plainview, N.Y. The speaker 55 referred to above and shown in the various FIGS. may be any one of several suitable commercially available speakers such as speaker Model No. 25SP222 available from Kobitone Audio Company, Mansfield, Tex. The relatively long range transceiver 34 referred to above, and shown in the various FIGS., may be any suitable commercially available relatively long-range transceiver sometimes referred to as a "walkie-talkie" commercially available from various sources and which will have a communications range as may be chosen for any specific embodiment. The operational amplifiers U1, U3, U4 and U5, FIGS. 7 and 8, may be a Model MC3303 operational amplifier, the comparator U2, FIG. 7, may be a Model LM-239 comparator, and the field effect transistors Q1 and Q2 may be a Model BS170 fold effect transistor.

Figure 13:
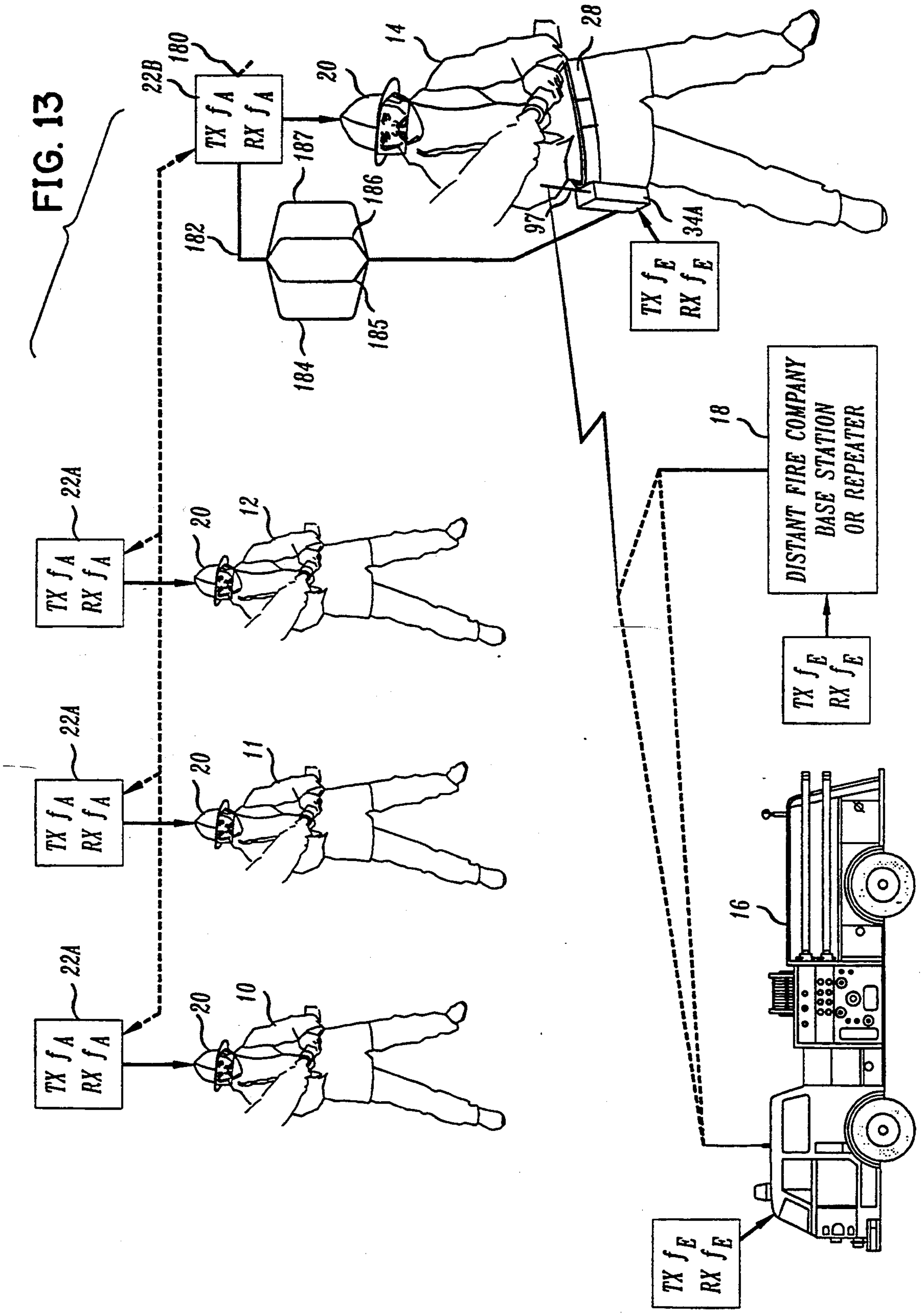
FIG. 13 is a diagrammatical illustration of an alternate embodiment of the combination protective helmet and communications system of the present invention and the function thereof.

Referring now to FIG. 13, there is illustrated diagrammatically a further embodiment of combination head-protective helmet 20 and voice communication system 22A mounted on the helmets 20 of the journeymen 10, 11 and 12, voice communication system 22B mounted on the helmet 20 of the group leader 14 and a transceiver 34A mounted on the belt 28 of the group leader 14 and connected to the voice communication system 22B by cable 182; it will be understood that this embodiment may include the combination head-protective helmet 20 and flame retardant earflap 106 of the type described above and shown in FIG. 9; the helmet 20 protects the wearer's head and the flame retardant earflap 106 protects the ears of the wearer of the helmet 20 from heat and flame the same as earflap 106 of FIG. 9. Voice communications system 22A mounted on the combination head-protective helmet 20 and flame retardant earflap 106 of the journeymen provides hands-free relatively short-range voice communications (e.g. reliable range of about fifty feet) between the journeymen, and the voice communications system 22A mounted on the helmets 20 of the journeymen in combination with the voice communications system 22B mounted on the combination helmet and flame retardant earflap of the group leader 14 provide the journeymen with generally hands-free short-range voice communications system with the group leader 14 and provide the group leader 14 with generally hands-free short-range voice communications with the journeymen. The transceiver 34A provides the group leader 14 with relatively long range (e.g. reliable range several miles) generally hands-free voice communication with a fire engine 16 or distant fire company, base station or repeater 18. Voice communications between the journeymen 10, 11 and 12 and between the journeymen and the group leader 14 are transmitted and received on frequency $f_A$ and voice communications between group leader 14 and a distant voice communication station such as the fire engine 16 and distant fire company, base station or repeater 18, are transmitted and received on frequency $f_E$.

Figure 16:
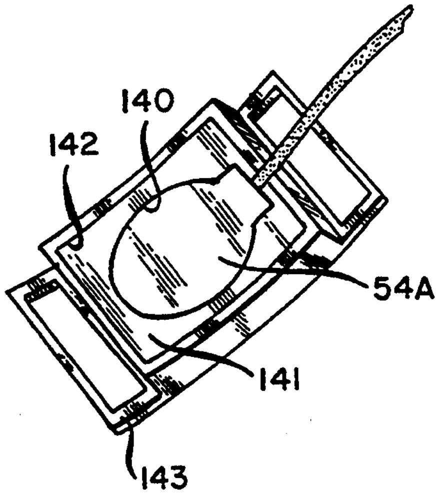
FIGS. 16 and 17 are top and side views illustrating in detail the manner of mounting a throat microphone shown in FIG. 14.
Figure 17:
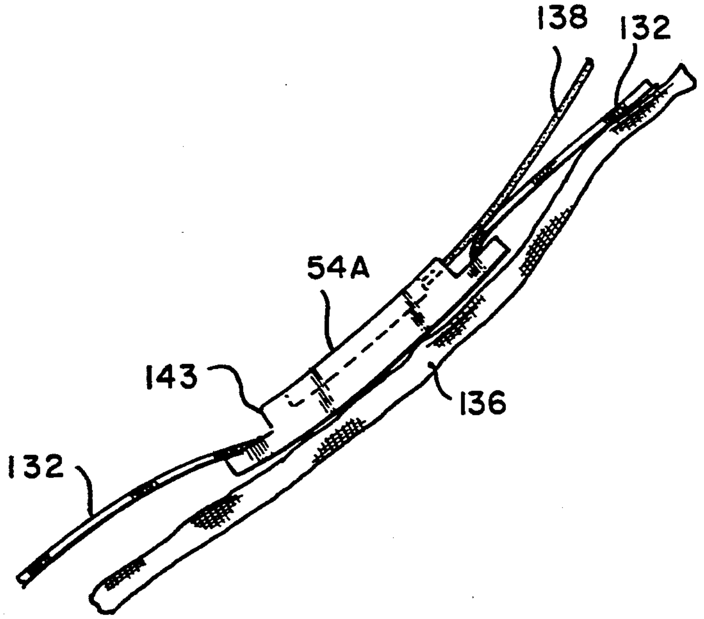
Figure 18:
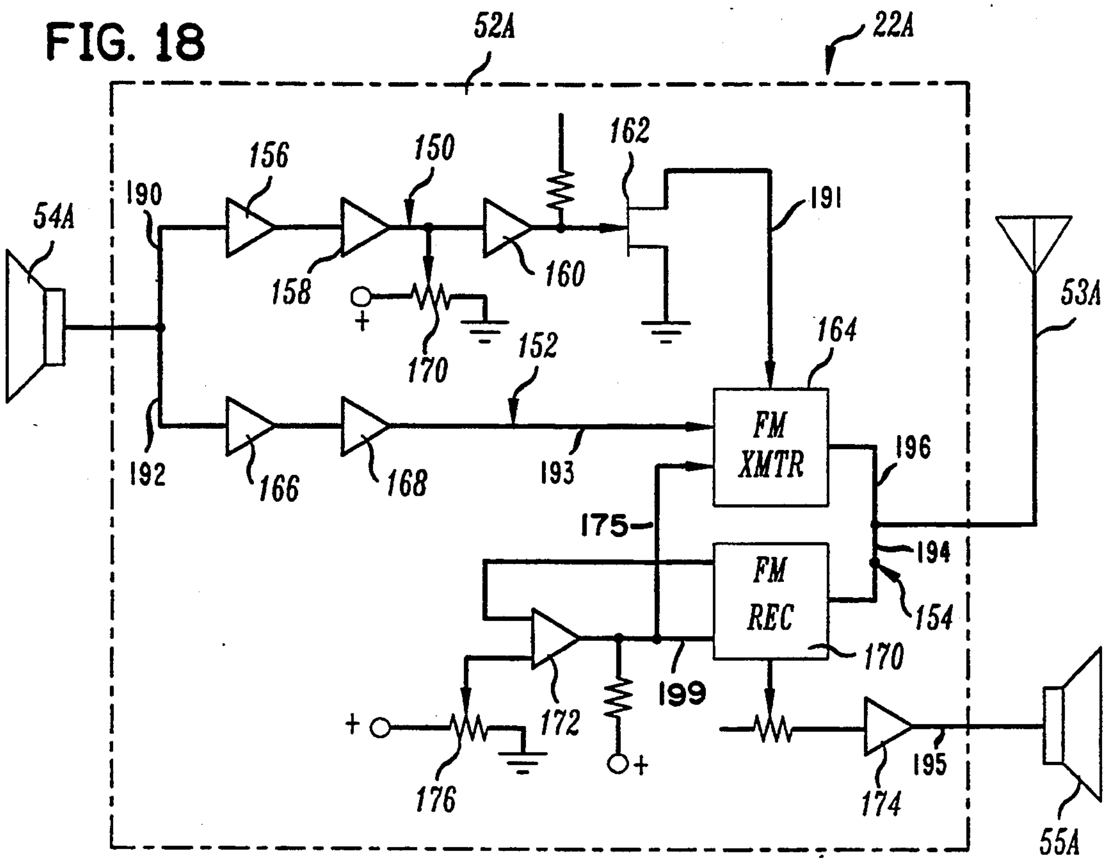
FIG. 18 is a circuit diagram of the throat microphone, speaker and transceiver circuitry of the voice communications system mounted on the combination head-protective helmet and flame retardant earflap of the journeymen shown in FIG. 13.

Referring now to FIGS. 14 through 17, it will be understood that the voice communications system 22A mounted on the combination helmet 20 and flame retardant earflap 106 of the journeymen 10, 11 and 12 (FIG. 13) includes, note particularly FIG. 15, transceiver circuitry 52A, speaker 55A and a battery 68 mounted in a housing 104A residing in a pocket 130 (FIGS. 14 and 14A) formed in the flame retardant earflap 106 (FIGS. 14 and 14A) which may be mounted to the internal impact cap 42 of the helmet 20 in the manner known to those skilled in the art, and a throat microphone 54A (FIG. 14) mounted on a strap 132 sewn for example to the inner surface 134 of an extension portion 136 of the flame retardant earflap 106; the throat microphone 54A, FIGS. 16 and 17, may be press-fitted into a complementarily shaped recess 140 formed in a silicone rubber seat 141 press-fitted into a recess 142 formed in a saddle or buckle 143 through which the strap 136 (FIGS. 14 and 17) extends. The throat microphone 54A is connected to the transceiver circuitry 52A by conductor 138 (FIGS. 14, 15 and 17) and an antenna 53A resides within, or underneath, the helmet 20 (FIG. 14) similar to the antenna 53 of FIG. 2, and which antenna 53A is shown in dashed outline in FIG. 14. It will be noted from FIG. 15 that the conductor 138 connecting the throat microphone 54A to the transceiver circuitry 52A and the antenna 53A are connected to the transceiver circuitry 52A removably, or for ready connection and disconnection, as indicated by the plug-in connectors 145 and 146 in FIG. 15. It will be understood that the speaker 55A is connected internally of the housing 104A to the transceiver circuitry 52A as illustrated in FIG. 18 and described below. Referring again to FIG. 14, it will be understood that the portion of the earflap 106 generally opposite the extension portion 136 may be provided with another extension portion 136A, and it will be further understood that upon the extension portion 136 of the flame retardant earflap 106 being wrapped or placed under the chin of a journeyman (FIG. 13), and the hook and eye fastener patch 147 (e.g. Velcro ®) provided on the extension portion 136 being engaged and connected to the hook and eye fastener patch 148 (e.g. Velcro ®) provided on the extension portion 136A, the extension portion 136 is fastened under the chin of the journeyman, and the throat microphone 54A is placed adjacent the throat of the journeyman sufficiently close for the receipt of voice communication from the journeyman. The helmet 20, FIG. 14, may be provided with a suitable transparent face shield 149 mounted pivotally to the external shell 41 of the helmet 20 in the manner known to the art.

Figure 19:
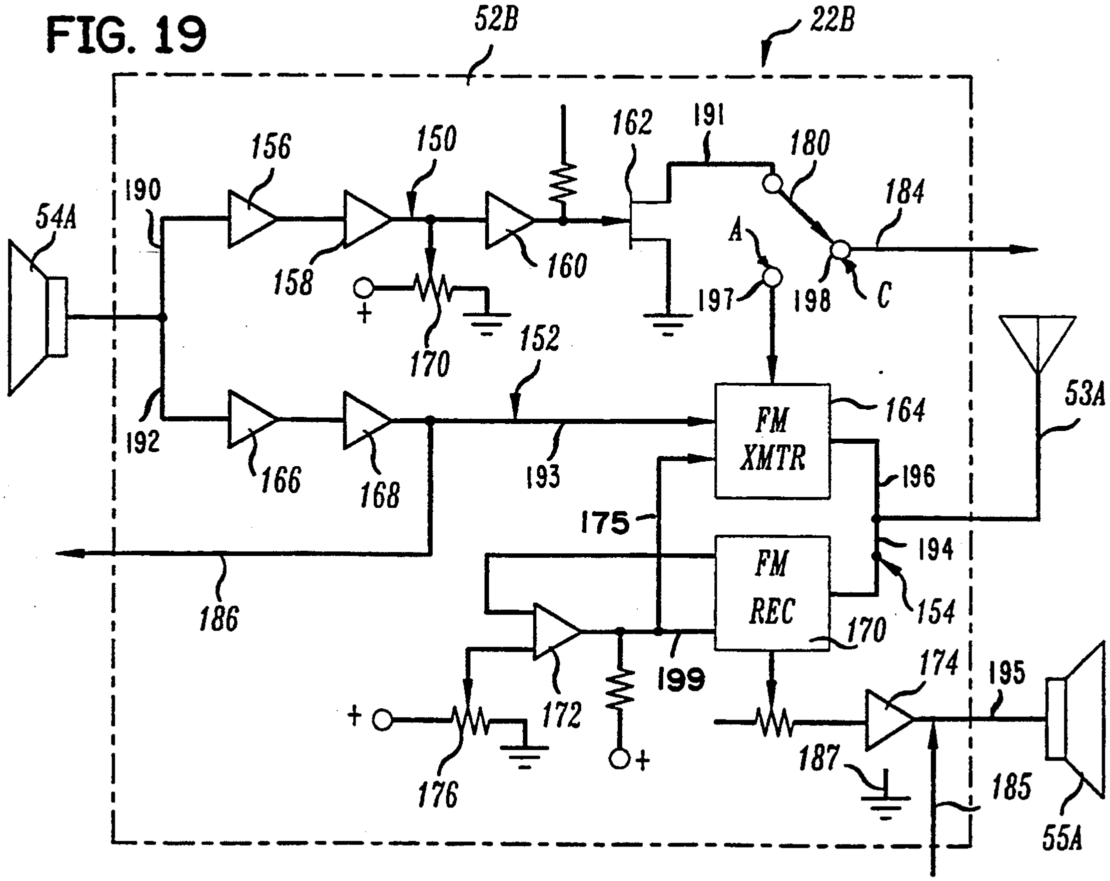
FIG. 19 is a diagram of the microphone, speaker, and transceiver circuitry of the voice communications system mounted on the combination head-protective helmet and flame retardant earflap of the group leader shown in FIG. 13.

The antenna 53A, throat microphone 54A, speaker 55A and circuit diagram for the transceiver circuitry 52A of the voice communications system 22A mounted on the combination head-protective helmet 20 and flame retardant earflap 106 of the journeymen 10, 11 and 12 (FIG. 13) are shown in FIG. 18, and the antenna 53A, throat microphone 54A, speaker 55A and the circuit diagram for the transceiver circuitry 22B of the voice communication system 22B mounted on the combination head-protective helmet 20 and flame retardant earflap 106 of the group leader 14 (FIG. 13) are shown in FIG. 19; it will be understood that upon the housing 104A (FIGS. 14 and 15) being mounted on the flame retardant earflap 106 (FIG. 14) in combination with the head-protective helmet 20 (FIG. 14) worn by the group leader 14 (FIG. 13) the transceiver circuitry 52B of FIG. 19 will be mounted in housing 104A.

Referring to FIG. 18, the transceiver circuitry 52A may include a control channel, or voice operated switch, indicated by general numerical designation 150, a transmit channel indicated by general numerical designation 152, a receive channel indicated by general numerical designation 154 and an FM transmitter 164 having an output 196. The control channel 150 has an input 190 and an output 191 and includes series connected suitable low Q bandpass filter 156 having a center frequency of 400 Hz, a suitable amplifier 158, a suitable comparator 160, and a suitable field effect transistor 162. The transmit channel 152 has an input 192 and an output 193 and includes series connected suitable low Q bandpass filter 166 having a center frequency of 1000 Hz and a suitable amplifier 168. The receive channel 154 has an input 194 and an output 195 and includes a suitable FM receiver 170, and a suitable amplifier 174; the receive channel 154 may further include a comparator 172 and variable resistor 174 which provide the FM receiver 170 with suitable squelch control in the manner known to the art. The input 190 of the control channel 150 and the input 192 of the transmit channel 152 are connected in common with the throat microphone 54A, the output 191 of the control channel 150 and the output 193 of the transmit channel 152 are connected to the transmitter 164, the output 196 of the FM transmitter 164 and the input 194 of the receive channel 154 are connected in common with the antenna 53A, and the output 195 of the receive channel 154 is connected to the speaker 55A.

Referring now to FIG. 19, it will be understood that the transceiver circuitry 52B of the voice communications system 22B is the same as the transceiver 52A shown in FIG. 18 of the voice communications system 22A except that the transceiver circuitry 52B is provided with a manually operable switch 180 shown in both FIGS. 19 and 13; the switch 180 has a first position A including a terminal 197 connected to the FM transmitter 164 and a second position C including a second terminal 198. Further it will be generally understood that upon the manually operable switch 180 being moved into position A by the group leader 14 (FIG. 13), the transceiver circuitry 52B receives and transmits on frequency $f_A$ for voice communications between the group leader 14 and the journeymen 10, 11 and 12 (FIG. 13), and that upon the manually operable switch 180 being moved into position C by the group leader 14, voice communication is provided between the group leader 14 and the fire truck 16 and distant fire company, base station or repeater 18 (FIG. 13) over frequency $f_E$.

As to the operation of the voice communication system 22A of FIG. 18 and the voice communication system 22B of FIG. 19, upon a journeyman, e.g. one of the journeymen 10, 11 or 12 of FIG. 13, speaking into the throat microphone 54A (FIG. 18), transmit audio signals are produced which pass through the control channel 150 where they are filtered by the bandpass filter 156, amplified by the amplifier 158, transmitted to the input of the comparator 160 where, determined by the variable resistor 170, an output signal from the comparator 160 is applied to the gate of the field effect transistor 162 to short the drain to the source of the transistor to thereby activate or turn on the FM transmitter 164. Upon the FM transmitter 164 being turned on, transmit audio signals from the throat microphone 54A of a journeyman are transmitted through the transmit channel 152, through the bandpass filter 166, amplifier 168, through the now turned on FM transmitter 164 and transmitted or broadcast over the antenna 53A at frequency $F_A$. The transmit audio signals from the antenna 53A will be broadcast and received by the antennas 53A of the other journeymen (FIG. 13) and the antenna 53A of the group leader 14 (FIG. 13); upon the transmit audio signals from the transmitting journeyman, i.e. the journeyman speaking and transmitting transmit audio signals into his throat microphone 54A, being received on frequency $f_A$ by the antenna 53A (FIG. 18) of the other journeymen and the antenna 53A (FIG. 19) of the group leader 14, the transmit audio signals become received audio signals and are transmitted over the respective receive channels 154, through the respective FM receivers 170, respective amplifiers 174 and to the respective speakers 55A where they are received as voice communication by the other journeyman and group leader. Transmit audio signals from the FM transmitter 164 (FIG. 18) in addition to being broadcast over the antenna 53A of the are also transmitted over the receive channel 154 through the FM receiver 170, the amplifier 174 and to the speaker 55A to permit the transmitting journeyman to hear his own voice and be assured that he is transmitting. It will be understood that by providing the bandpass filter 156 of the control channel 150 with a center frequency of 400 Hz, substantial assurance is provided that the FM transmitter 164 will be turned on upon a journeyman speaking into the throat microphone 54A because, as is known to those skilled in the art, whether the journeyman has a voice of high pitch or low pitch, the voice will include audio signals at the relatively low 400 Hz range. Further, it will be understood that by providing the bandpass filter 166 of the transmit channel 152 with a center frequency of 1000 Hz, an audio range is provided which substantially assures that voice communications being transmitted are capable of being understood by the other journeymen and/or the group leader. It will be further understood (FIGS. 18 and 19) that the output 199 of the comparator 172 of the receive channel 154 is connected both to the FM receiver 170 and to the FM transmitter 164 by conductor 175 to render the FM transmitter 164 inoperable upon a voice communication transmission being received by the FM receiver 170.

Referring more particularly to the relatively long range receiver 34A (e.g. a suitable walkie talkie) shown generally in FIG. 13, the transceiver 34A is connected to the voice communications system 22B provided on the combination head-protective helmet 20 (FIG. 14) and flame retardant earflap 106 (FIG. 14) of the group leader 14 by a multi-conductor or cable 182 including conductors 184,185,186 and 187; the transceiver 34A or suitable walkie talkie may be the Midland LMR (land mobile radio) walkie talkie model No. 70-132B made by Midland International, Korea, and available in the United States from numerous representatives, such as for example CPS Communications, R.D. 2, Orefield, Pa. It will be understood that, and as known to those skilled in the art, the relatively long range transceiver 34A, e.g. a suitable walkie talkie, will include as known to those skilled in the art a microphone input (not shown), a speaker input (not shown), an internal ground connection (not shown), and an internal press or push to talk connection (not shown); in normal operation, as is further known to those skilled in the art, the press to talk switch upon being depressed turns on the transmitter (not shown) of the relatively long range transceiver 34A. It will be further understood, as shown in more detail in FIG. 19, that the conductor 184 (FIGS. 13 and 19) connects the press to talk connection in the transceiver 34A to terminal C, the conductor 185 (FIGS. 13 and 19) connects the speaker input of the transceiver 34A to the speaker 55A (FIG. 19), the conductor 186 (FIGS. 13 and 19) connects the microphone input of the transceiver 34A to the output of the amplifier 168 (FIG. 19) in the transmit channel 152, and the conductor 187 (FIGS. 13 and 19) connects the internal ground connection of the transceiver 34A to the common ground connection 185 of the transceiver circuitry 52B as shown in the lower righthand portion of FIG. 19.

Referring still to FIGS. 19 and 13, and in particular to FIG. 19, it will be understood that upon the manual switch 180 being connected to terminal 197 (position A) by the group leader 14 (FIG. 13) the transceiver circuitry 52B of the voice communications system 22B mounted in the combination helmet 20 (FIG. 14) and flame retardant earflap 106 (FIG. 14) of group leader 14 (FIG. 13) transmits and receives on frequency $f_A$ in the same manner as described above with regard to the transceiver circuitry 52A shown in FIG. 18. It will be further understood that upon the manual switch 180 being moved into contact with terminal 198 (position C) by the group leader 14 (FIG. 13), the FM transmitter 164 and FM receiver 170 are rendered inoperable precluding the group leader 14 from transmitting to or receiving voice communication transmissions from the journeymen 10, 11 and 12 (FIG. 13). With the manual switch in engagement with terminal 198, the group leader 14 is in voice communication, for receipt and transmission, with the fire engine 16, distant fire company, base station or repeater 188 (FIG. 13) over frequency $f_E$ through the transceiver 34A. Upon the group leader speaking into the throat microphone 54A, FIG. 19, transmit audio signals are passed through the bandpass filter 166, amplifier 168, over conductor 186 to the microphone input of the long range transceiver or walkie talkie 34A, FIG. 13, whereby such voice communication or transmit audio signals are transmitted at frequency $f_E$ over the antenna 97 of the long range transceiver 34A to the fire engine 16 and distant fire company, etc. 18. Voice communications from the fire engine 16 and distant fire company, base station or repeater 18 to the group leader 14, FIG. 13, are received at frequency $f_E$ by the antenna 97 of the long range transceiver or walkie talkie 34A mounted on the belt 20 of the group leader 24 where they are transmitted from the long range transceiver 34A over the conductor 185 to the speaker 55A of the group leader's transceiver 52B, FIG. 19. It will be further understood that when the manually operable switch 180 (FIG. 19) is in contact with terminal 197 (position A) the group leader 14 transmits and receives on frequency $f_A$ with the journeymen 10, 11 and 12, but at this time the group leader 14 can also hear voice communications at frequency $f_E$ from the fire engine 16 and distant fire company 18 through the relatively long range transceiver 34A and over the conductor 185 to the group leader's speaker 55A.

Figure 20:
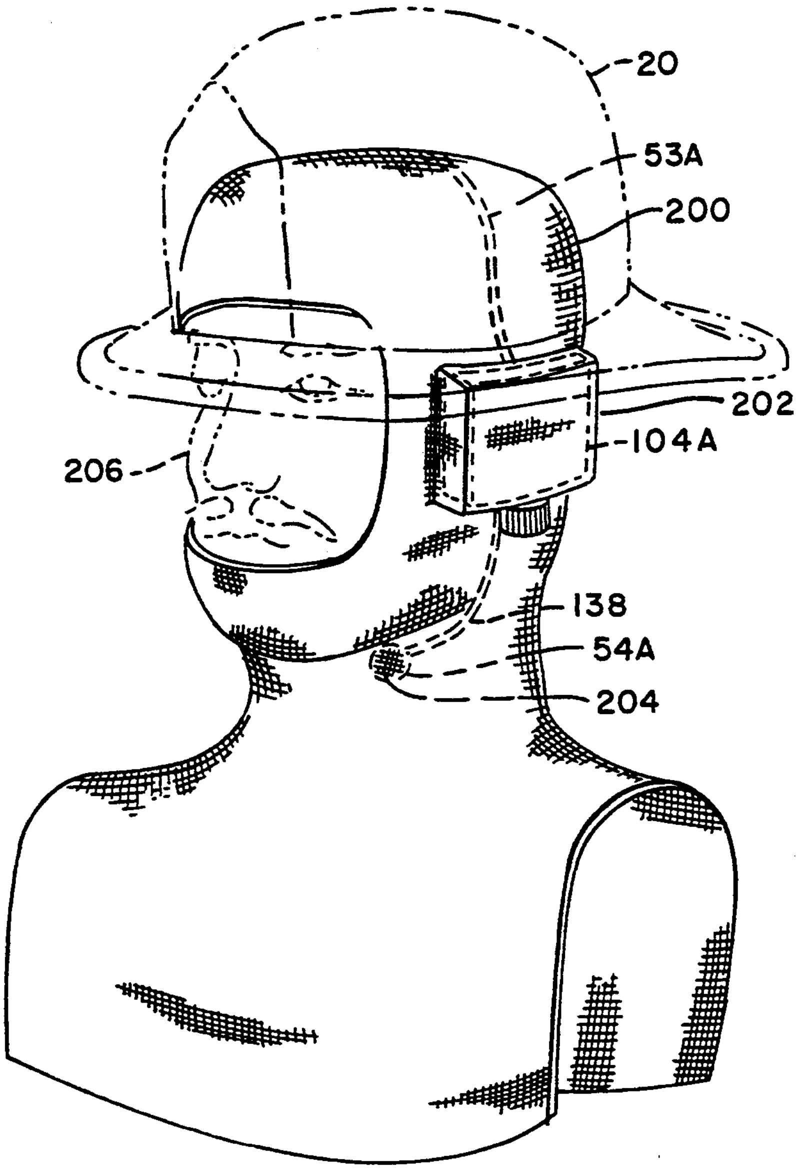
FIG. 20 illustrates, diagrammatically, a further alternate embodiment of the present invention including the flexible flame retardant hood shown therein and on which is mounted a microphone, speaker, transceiver circuitry and antenna of a voice communications system with the hood being in combination with a head-protective helmet of the type shown in FIGS. 2, 3 and 14.

Referring now to FIG. 20, there is shown a flame retardant hood 200, protective member, of suitable flexible flame retardant material which hood may be provided with a pocket 202 (similar to pocket 130 of FIGS. 14 and 14A) for receiving the housing 104A (shown in dashed outline) containing transceiver circuitry 52A of FIG. 18 if the hood 200 is worn by a journeyman 10, 11 or 12 (FIG. 13) and for containing transceiver circuitry 52B of FIG. 19 if the hood 200 is worn by the group leader 14 (FIG. 13), speaker 55A and battery 68 shown in FIG. 15. A throat microphone, such as throat microphone 54A shown in FIG. 14, may be connected to the transceiver circuitry 52A or 52B mounted in the housing 104A by a suitable conductor such as conductor 138, and an antenna 53A, such as antenna 53A shown in FIG. 14, may reside under the helmet 20 and may be connected to the transceiver circuitry 52A or 52B; the throat microphone 54A, conductor 138 and antenna 53A are also shown in dashed outline in FIG. 20. Thus it will be understood that in this alternate embodiment of the invention either the voice communication system 22A of a journeyman 10, 11 or 12 (FIG. 13) or the voice communication system 22B of the group leader 14 (FIG. 13) may be provided in combination with the head-protective helmet 20 shown in FIG. 20. The throat microphone 54A may be provided with a hook and eye fastener patch 204 on its outer surface for engagement and connection with a hook and eye fastener patch (not shown) provided on the interior of the hood 200 in the throat area of the wearer 206 to place the throat microphone 54A on a suitable position on the throat of the wearer 206 to receive voice communications from the wearer 206 of the helmet 20. It will be further noted from FIG. 20 that the protective member or hood 200 protects portions of the head, the ears, the neck and portions of the shoulders of the wearer 206 of the helmet 20 from heat and flame and it will be understood that the protective member or hood 200 is part of a combination including the head-protective helmet 20. Further, the hood 200 may be mounted removably to the helmet 20 by providing each with patches of engageable hook and eye fasteners (not shown). It will be understood that the protective member or hood 200 is part of a combination including head-protective helmet 20.

Referring now to FIGS. 21–25, a further alternate embodiment of the present invention is illustrated. This alternate embodiment includes the combination of a flame retardant shroud 300 of suitable rigid flame retardant material, such as a suitable flame retardant plastic, and a head-protective helmet such as helmet 20 of FIGS. 2, 3, 9 and 14; the shroud 300 protects at least the ears of the wearer of the helmet 20 from heat and flame. The shroud 300 is provided with an upwardly extending portion or tab 302 which mounts the shroud 300 removably to the internal impact cap, internal impact cap 42 shown in FIGS. 3, 14 and 24. More particularly, the upwardly extending portion or tab 302 is wedged underneath the resilient circular mounting member 48 shown in FIGS. 3 and 24, to wedge the upwardly extending portion or tab 302, FIG. 24, between the resilient circular mounting member 48 and the inner or internal impact cap 42 which resides under the external shell 41 of the helmet 20. Connectors 342 and 344 may be mounted pivotally to the shroud 300 to permit a suitable facepiece (not shown) to be mounted removably to the shroud 300

Figure 21:
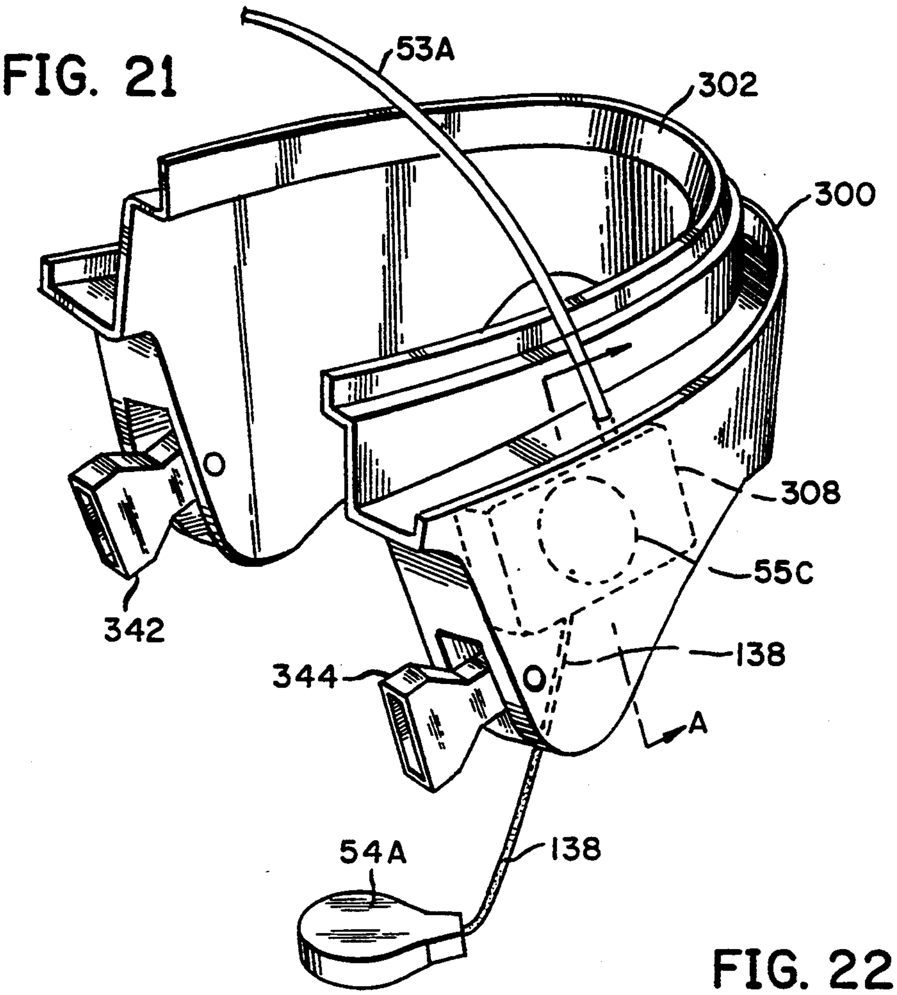
FIGS. 21–25 illustrate, diagrammatically, a still further embodiment of the present invention including the rigid flame retardant shroud shown in FIG. 21 on which is mounted a speaker and transceiver circuitry and which shroud is shown in combination with a head-protective helmet in FIG. 24.
Figure 22:
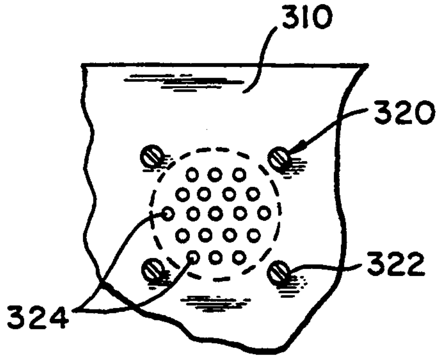
Figure 23:
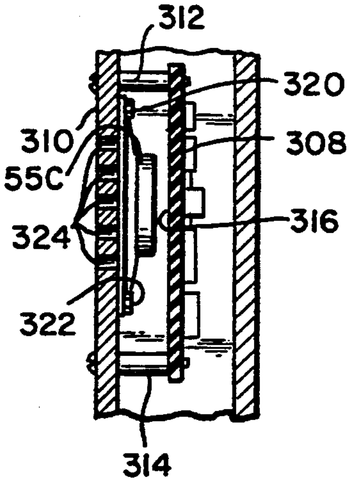

Referring to FIGS. 21 and 23, it will be understood that transceiver circuitry 52A or 52B of the respective voice communication systems 22A and 22B of the respective journeymen 10, 11 and 12 (FIG. 13) and group leader 14 (FIG. 13), of the types illustrated in FIGS. 18 and 19, may be mounted on a printed circuit board 308 (FIG. 23), and which printed circuit board may be removably mounted to the inner wall 310 of the shroud 300 by screws 312 and 314 as illustrated in FIG. 23. A speaker 55C may be connected to the transceiver circuitry provided on the printed circuit board 308 by conductor 316 and the speaker 55C may be removably mounted to the inner wall 310 of the shroud 300 by suitable screws 320 and 322, FIGS. 23 and 22. As shown in FIGS. 22 and 23, the inner wall 310 of the shroud 300 may be provided with a plurality of holes or openings 324 for communicating voice communication (sound waves) from the speaker 55C to the ear of a wearer of the combination head-protective helmet 20 and shroud 300.

Figure 14:
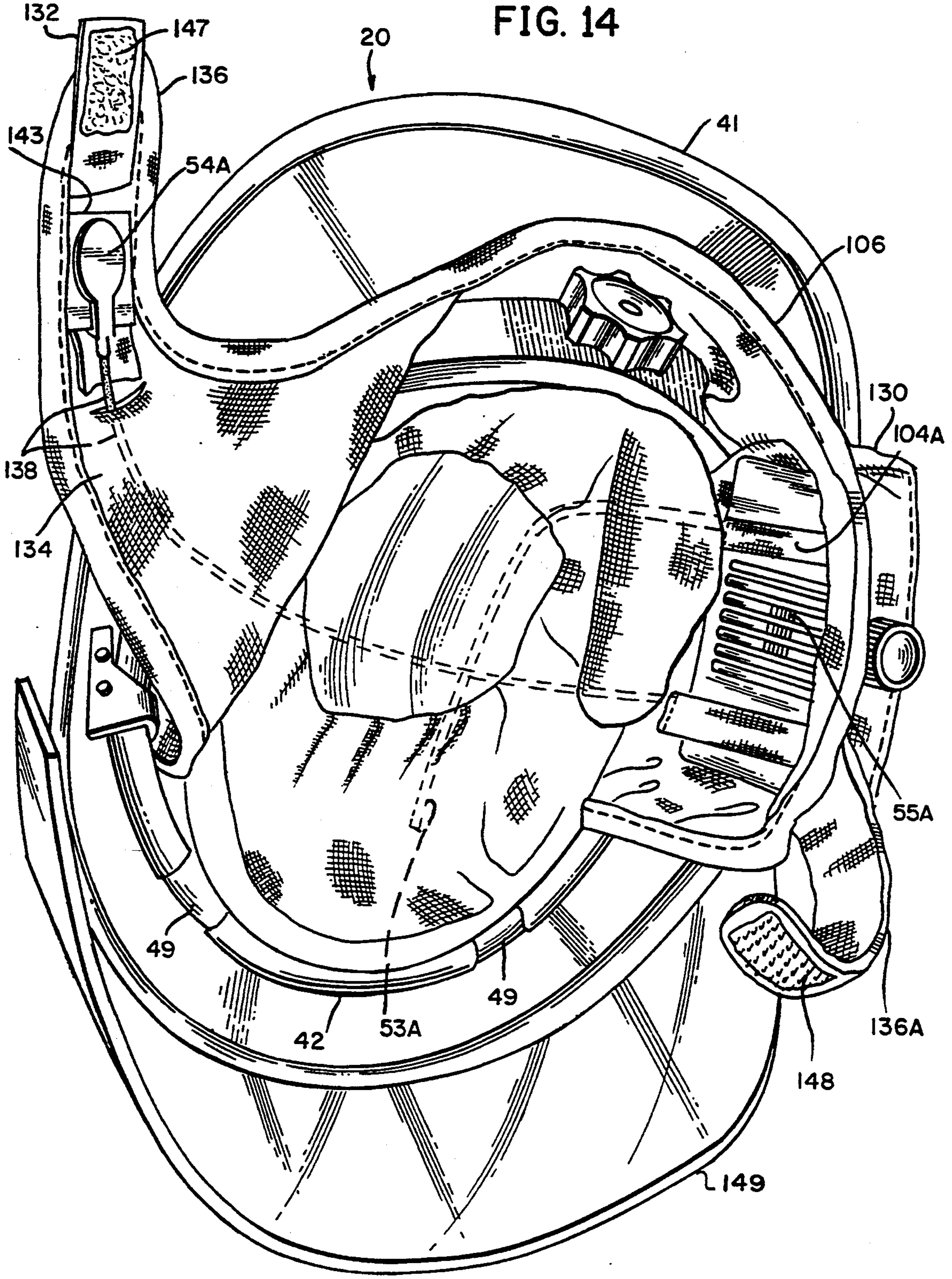
FIG. 14 is a view looking inwardly into a combination head-protective helmet and flame retardant earflap provided with an alternate embodiment of a voice communications system of the present invention.
Figure 24:
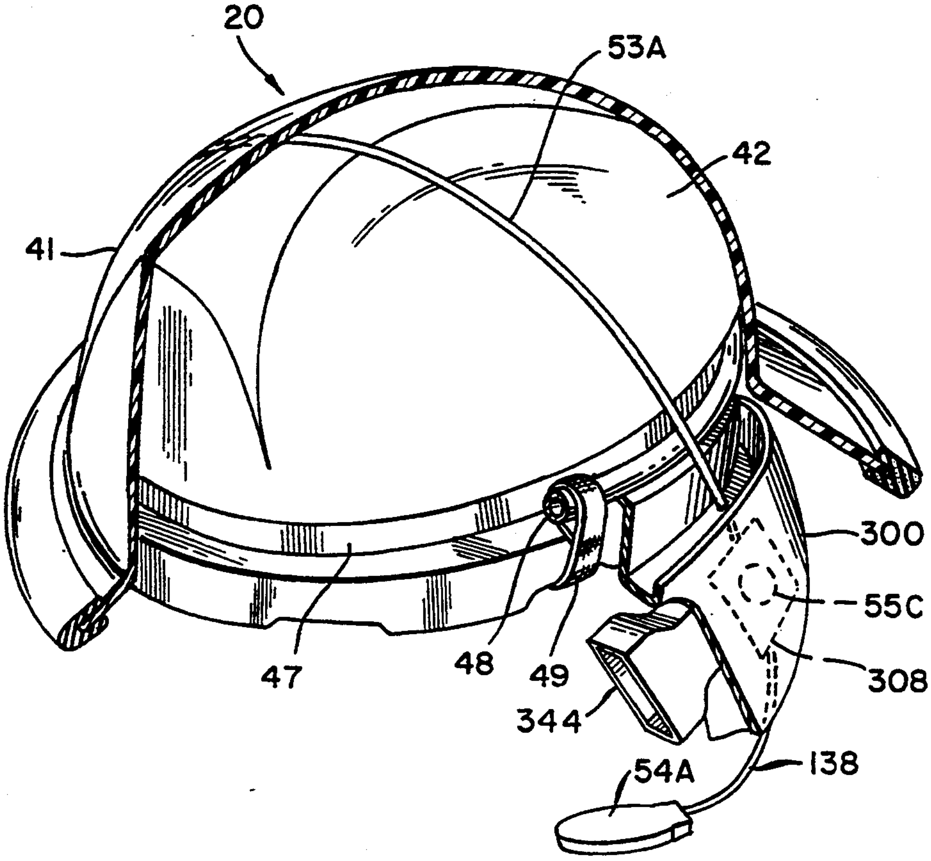
Figure 25:
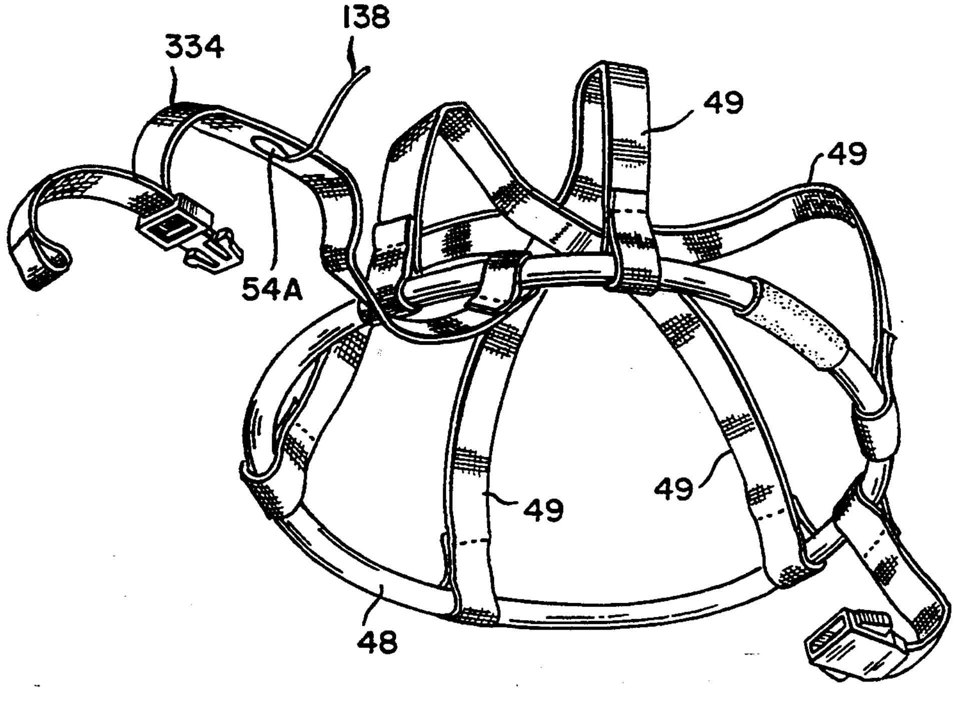

As shown in FIGS. 21 and 24, a suitable throat microphone, such as throat microphone 54A may be connected to the transceiver circuitry mounted on the printed circuit board 308 by suitable conductor 138. The throat microphone 54A, in turn, may be suitably mounted (such as by hook and eye patches not shown) on a chin strap 334 (FIG. 25) provided on the cradle of straps 49 mounted, as shown in FIG. 14 and described above, to the inner impact cap 42 by the resilient circular mounting member 48. The throat microphone 54A is mounted on the chin strap 334 in a position, such that upon the chin strap 334 being fastened underneath the chin of the wearer of the combination helmet 20 and shroud 300, the throat microphone 54A is placed at a suitable position on the throat of the wearer of the combination head-protective helmet 20 and shroud 300 to receive voice communications from the wearer. A suitable antenna 53A is connected to the transceiver circuitry mounted on the printed circuit board 308; the throat microphone conductor 138 and antenna 53A may be connected removably to the transceiver circuitry by suitable connectors such as connectors 145 and 146 of FIG. 15. Accordingly, it will be understood that the alternate embodiment of the present invention illustrated in FIGS. 21–25 includes the head-protective helmet 20 in combination with either the voice communication system 22A of a journeyman 10, 11 or 12 of FIG. 13 or the voice communication system 22B of the group leader 14 of FIG. 13 depending upon whether the transceiver circuitry 52A (FIG. 18) or transceiver circuitry 52B (FIG. 19) is mounted on the printed circuit board 308.

Referring again to FIGS. 9, 14, 20 and 24, and in brief summary with regard to the combination head-protective helmet 20 and flame retardant earflap 106 of FIG. 9, the head-protective helmet 20 and flame retardant earflap 106 of FIG. 14, the head-protective helmet 20 and flame retardant hood 200 of FIG. 20 and the head-protective helmet 20 and flame retardant shroud 300 of FIG. 24, it will be understood that such flame retardant earflap, hood and shroud extend downwardly from the helmet and cover and protect at least the ears of the wearer of the helmet from heat and flame.

It will be understood by those skilled in the art that many modifications and variations may be made in the present invention without departing from the spirit and the scope thereof.

What is claimed is:

1. Combination head-protective helmet and voice communication system for providing generally hands-free voice communication between a journeyman and a group leader, comprising:

(a) a plurality of combination head-protective helmets and voice communication systems, each combination including:

(i) a head-protective helmet and flexible flame retardant earflap mounted to said helmet and extending downwardly from said helmet, said earflap for covering and protecting at least the ears of said wearer of said helmet from heat and flames, and said earflap including an extension portion for being fastened under the chin of the wearer of said helmet;

(ii) a transceiver for transmitting and receiving voice communication, said transceiver including interconnected transceiver circuitry, a speaker, a throat microphone and an antenna;

(iii) first and second mounting means;

(iv) housing means for receiving said transceiver circuitry and said speaker;

(v) said first mounting means for mounting said housing on said earflap to place said speaker adjacent to and in voice communication with an ear of the wearer of said helmet and said second mounting means for mounting said throat microphone on said extension portion of said earflap and upon said extension portion of said earflap being fastened under the chin of the wearer of said helmet said microphone being placed adjacent to and in voice communication with the throat of the wearer; and (vi) said antenna residing within said helmet;

(b) one of said combination head-protective helmet and voice communication systems for being worn by the journeyman and another one of said combination head-protective helmet and voice communication systems for being worn by the group leader;

(c) said voice communication systems for transmitting and receiving voice communications between the journeyman and group leader on a first frequency;

(d) said voice communication system in combination with said helmet worn by the group leader including a switch having first and second positions;

(e) a second transceiver for being mounted on the group leader and for transmitting and receiving voice communications on a second frequency between the group leader and a distant voice communication station;

(f) conductor means interconnecting said second transceiver with said voice communication system in combination with said helmet worn by the group leader; and (g) upon said switch being in said first position voice communication is transmitted and received between the group leader and the journeyman on said first frequency using said voice communication systems in combination with the head-protective helmets worn by the journeyman and the group leader and upon said switch being in said second position voice communication is transmitted and received between the group leader and said distant voice communication station on said second frequency using said second transceiver mounted on the group leader.

2. The combination according to claim 1 wherein upon said switch being in said first position for transmitting and receiving voice communication between the group leader and the journeyman on said first frequency said voice communication system in combination with said helmet worn by the group leader also permitting the group leader to receive voice communication from said distant voice communication station over said second frequency.

3. Combination head-protective helmet and voice communication system for providing generally hands-free voice communication between a journeyman and another person provided with means for receiving transmit audio signals, comprising:

a head-protective helmet for being worn by the journeyman and a flexible flame-retardant earflap mounted to said helmet and extending downwardly from said helmet, said earflap for covering and protecting at least the ears of the journeyman from heat and flames, and said earflap including an extension portion for being fastened under the chin of the journeyman;

a transceiver for transmitting and receiving voice communication, said transceiver including interconnected transceiver circuitry, a speaker, a throat microphone and an antenna;

first and second mounting means;

housing means for receiving said transceiver circuitry and said speaker;

said first mounting means for mounting said housing on said earflap to place said speaker adjacent to and in voice communication with an ear of the journeyman and said second mounting means for mounting said throat microphone on said extension portion of said earflap and upon said extension portion of said earflap being fastened under the chin of the journeyman said microphone being placed adjacent to and in voice communication with the throat of the journeyman;

said antenna residing within said helmet;

said transceiver circuitry comprising a control channel, a transmit channel and a receive channel including an FM receiver and wherein each channel has an input and an output, wherein said transceiver circuitry further comprises an FM transmitter having an output, wherein said inputs of said control channel and said transmit channel are connected in common with said microphone, wherein said outputs of said control channel and said transmit channel are connected to said FM transmitter, wherein said output of said FM transmitter and said input of said receive channel are connected in common with said antenna, wherein the output of said receive channel is connected to said speaker, wherein upon the journeyman transmitting voice communication to said microphone, said microphone producing transmit audio signals communicated to said control channel and to said transmit channel and wherein said transmit audio signals communicated to said control channel activate said FM receiver whereby transmit audio signals communicated to said control channel are transmitted by said FM transmitter to and broadcast by said antenna to the another person, and wherein said transmit audio signals transmitted by said FM transmitter are also communicated to said FM receiver and to said speaker permitting the journeyman to hear his voice communication transmitted to said speaker and thereby be assured that his voice communication system is operable, and wherein upon receive audio signals being received by said antenna, said received audio signals are communicated to said receive channel, to said FM receiver and to said speaker which produces voice communication received by the journeyman.

4. The combination according to claim 3 wherein the receive channel further includes a comparator having an output and a variable resistor, said output of said comparator connected to said FM receiver to provide said FM receiver with squelch control and said output of said comparator also connected to said FM transmitter to render said FM transmitter inoperable upon voice communication being received by said FM receiver.

5. Combination head-protective helmet and voice communication system for providing generally hands-free voice communication between a group leader and a journeyman provided with means for receiving audio signals, comprising:

a head-protective helmet for being worn by the group leader and a flexible flame-retardant earflap mounted to said helmet and extending downwardly from said helmet, said earflap for covering and protecting at least the ears of the group leader from heat and flames, and said earflap including an extension portion for being fastened under the chin of the group leader;

a transceiver for transmitting and receiving voice communication, said transceiver including interconnected transceiver circuitry, a speaker, a throat microphone and an antenna;

first and second mounting means;

housing means for receiving said transceiver circuitry and said speaker;

said first mounting means for mounting said housing on said earflap to place said speaker adjacent to and in voice communication with an ear of the group leader and said second mounting means for mounting said throat microphone on said extension portion of said earflap and upon said extension portion of said earflap being fastened under the chin of the group leader said microphone being placed adjacent to and in voice communication with the throat of the group leader;

said antenna residing within said helmet;

said transceiver circuitry comprising a control channel, a transmit channel and a receive channel including an FM receiver and wherein each channel has an input and an output, wherein said transceiver circuitry further comprises a switch having a first position including a first terminal and a second position including a second terminal and an FM transmitter having an output, wherein said inputs of said control channel and said transmit channel are connected in common with said microphone, wherein said output of said control channel is connected to said switch, and wherein said first contact and said output of said transmit channel are connected to said FM transmitter, wherein said output of said FM transmitter and said input of said receive channel are connected in common with said antenna, wherein the output of said receive channel is connected to said speaker, wherein upon said switch being in said first position and the group leader transmitting voice communication to said microphone, said microphone producing transmit audio signals communicated to said control channel and to said transmit channel and wherein said transmit audio signals communicated to said control channel activate said FM receiver whereby transmit audio signals communicated to said control channel are transmitted by said FM transmitter to and broadcast by said antenna to said journeyman, and wherein said transmit audio signals transmitted by said FM transmitter are also communicated to said FM receiver and transmitted to said speaker permitting the group leader to hear his voice communication transmitted to said speaker and thereby be assured that his voice communication system is operable, and wherein upon receive audio signals being received by said antenna, said received audio signals are communicated to said receive channel, to said FM receiver and to said speaker which produces voice communication received by the group leader.

6. The combination according to claim 5 wherein said voice communications transmitted and received between the group leader and the journeyman are transmitted and received on a first frequency, and wherein said voice communication system in combination with said helmet worn by the group leader further comprises a second transceiver for being mounted on the group leader and for transmitting and receiving voice communications on a second frequency between the group leader and a distant voice communication station, wherein said combination further comprises conductor means interconnecting said second transceiver with said voice communication system in combination with said helmet worn by the group leader and wherein upon said switch being in said first position voice communication is transmitted and received between the group leader and the journeyman on said first frequency using said voice communication systems in combination with the head-protective helmets worn by the group leader and the journeyman and wherein upon said switch being in said second position voice communication is transmitted and received between the group leader and said distant voice communication station on said second frequency using said second transceiver mounted on the group leader.

7. The combination according to claim 6 wherein said second transceiver includes a press to talk connection, a speaker input, a microphone input and an internal ground connection, wherein said conductor means includes first, second, third and fourth conductors, wherein said first conductor connects said press to talk connection to said second terminal of said switch, wherein said second conductor connects said speaker input to said speaker, wherein said third conductor connects said microphone input to said transmit channel, wherein said transceiver circuitry has a common ground and-wherein said fourth conductor connects said internal ground conductor to said common ground.

8. The combination according to claim 5 wherein the receive channel further includes a comparator having an output and a variable resistor, said output of said comparator connected to said FM receiver to provide said FM receiver with squelch control and said output of said comparator also connected to said FM transmitter to render said FM transmitter inoperable upon voice communication being received by said FM receiver.

9. The combination according to claim 1, 3 or 5 wherein said extension portion of said earflap has an inner surface and wherein said second mounting means comprise a strap secured to said inner surface and wherein said throat microphone is secured to said strap, and wherein said first mounting means comprise a pocket formed in said earflap for receiving said housing.

10. The combination according to claim 1, 3 or 5 wherein said first mounting means comprise a pocket formed in said earflap which pocket opens into the interior of said earflap.

11. Combination head gear and voice communication system for providing generally hands-free voice communications between the wearer and others, comprising:

head-protective helmet for providing head protection to the head of the wearer of said helmet, said helmet including an external shell, an internal impact cap for being mounted internally of said external shell, a suspension system mounted to said internal impact cap and for suspending said internal impact cap and said external shell above the head of said wearer, said suspension system including a generally circular mounting member residing in a generally circular external groove provided in said internal impact cap and a plurality of straps residing internally of said impact cap and connected thereto by said circular mounting member, said straps for being engaged by the head of said wearer, said suspension system and said internal impact cap spaced apart to provide a space therebetween, and said impact cap provided with a recess;

transceiver means for transmitting and receiving voice communications, said transceiver means including interconnected transceiver circuitry, an antenna, a bone conduction microphone, and a speaker;

a battery residing in said recess and for providing energy to said transceiver means;

an ear cup, said bone conduction microphone and said speaker mounted on said ear cup;

said antenna residing internally of said helmet;

said transceiver circuitry mounted to the underside of said internal cap and residing in said space between said internal cap and said suspension system; and a bracket mounted to said circular mounting member, a hinge pin mounted to said bracket, and said ear cup mounted pivotally on said hinge pin, and a torsion spring surrounding said hinge pin and spring biasing said ear cup inwardly to cause said microphone to engage and be placed in voice communication with a head bone of said wearer and to place said speaker in voice communication with an ear of said wearer of said helmet.

12. The combination apparatus of claim 11 wherein said apparatus comprises a plurality of combination headgear and communications systems as defined by claim 11, wherein one of said combination headgear and communications systems is for being worn by a journeyman and another one of said combination headgear and communications systems is for being worn by a group leader, wherein the transceiver mounted on said headgear worn by said journeyman is for transmitting and receiving voice communications on a first frequency and wherein said transceiver mounted on said headgear worn by said group leader is for receiving and transmitting voice communications on a second frequency; and wherein said apparatus further comprises module means including a first module transceiver and a second module transceiver, said first module transceiver for receiving and transmitting voice communications on said first frequency and said second module transceiver for receiving and transmitting voice communications on said second frequency, said module means further including switching means for automatically transferring voice communications from said journeyman received on said first module transceiver at said first frequency to said second module transceiver for retransmission to said group leader at said second frequency and for transferring voice communications from said group leader received by said second module transceiver at said second frequency to said first module transceiver for retransmission to said journeyman at said first frequency thereby enabling hands-free voice communications between said journeyman and said group leader.

13. The combination according to claim 12 wherein the communications provided by said combination are relatively short-range communications and wherein said combination further includes a relatively long-range transceiver for transmitting and receiving communications at a third frequency to and from a distant communications center, said long-range transceiver for being worn by said group leader and for being connected to said module means, said module means including further switching means for automatically transferring voice communications from said group leader received by said second module transceiver at said second frequency to said long-range transceiver for retransmission to said distant communications center at said third frequency and for automatically transferring voice communications from said distant communications center received by said long-range transceiver at said third frequency to said second module transceiver for retransmission to said group leader at said second frequency to enable hands-free relatively long-range communications between said group leader and said distant communications center.

* * * * *